US010199926B2

(12) United States Patent
Kobayashi

(10) Patent No.: US 10,199,926 B2
(45) Date of Patent: Feb. 5, 2019

(54) POWER ROUTER AND OPERATION CONTROL METHOD THEREOF, POWER NETWORK SYSTEM, AND NON-TRANSITORY COMPUTER READABLE MEDIA STORING PROGRAM

(71) Applicant: NEC Corporation, Tokyo (JP)

(72) Inventor: Noriaki Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 681 days.

(21) Appl. No.: 14/763,661

(22) PCT Filed: Jan. 24, 2014

(86) PCT No.: PCT/JP2014/000347
§ 371 (c)(1),
(2) Date: Jul. 27, 2015

(87) PCT Pub. No.: WO2014/115557
PCT Pub. Date: Jul. 31, 2014

(65) Prior Publication Data

US 2015/0357909 A1 Dec. 10, 2015

(30) Foreign Application Priority Data

Jan. 28, 2013 (JP) ................................ 2013-013632

(51) Int. Cl.
*H02M 1/36* (2007.01)
*H02J 5/00* (2016.01)
(Continued)

(52) U.S. Cl.
CPC ................ *H02M 1/36* (2013.01); *H02J 3/06* (2013.01); *H02J 3/14* (2013.01); *H02J 5/00* (2013.01);
(Continued)

(58) Field of Classification Search
CPC .......... H02M 1/36; H02M 7/70; H02M 7/493; H02M 2001/0054; H02M 2001/0032;
(Continued)

(56) References Cited

U.S. PATENT DOCUMENTS 6,052,633 A 4/2000 Fukuyama et al.
2002/0198648 A1* 12/2002 Gilbreth .................. H02J 1/10 701/100

(Continued)

FOREIGN PATENT DOCUMENTS

EP 1 580 862 A1 9/2005
EP 2 192 681 A1 6/2010

(Continued)

OTHER PUBLICATIONS

Supplementary European Search Report issued by the European Patent Office in counterpart European Patent Application No. 14743325.4, dated Jan. 3, 2017.

(Continued)

*Primary Examiner* — Jared Fureman
*Assistant Examiner* — Emmanuel R Dominique
(74) *Attorney, Agent, or Firm* — Finnegan, Henderson, Farabow, Garrett & Dunner, L.L.P.

(57) ABSTRACT

A management or control of a power router is more appropriately performed when a power network system in which power cells are asynchronously connected with each other. A plurality of power conversion legs bi-directionally convert power, one ends thereof are connected with a direct current bus and the other ends thereof are connected with an external connection partner as an external connection terminal. A control unit controls operations of the plurality of power conversion legs. The control unit receives a control instruction including a designation of a stopping target leg. The control unit performs an adequacy determination of whether
(Continued)

POWER ROUTER 19 CONTROL UNIT 100 52 850 MANAGEMENT SERVER 101 102 11 811 115 UTILITY GRID LEG 1 12 830 125 LOAD LEG 2 13 835 135 STORAGE BATTERY LEG 3 14 145 TO OTHER POWER CELL LEG 4 the stopping target leg can be stopped. The control unit stops the stopping target leg when the stopping target leg can be stopped.

21 Claims, 15 Drawing Sheets

(51) Int. Cl.

| | |
|---|---|
| ***H02M 7/70*** | (2006.01) |
| ***H02J 7/02*** | (2016.01) |
| ***H02M 7/493*** | (2007.01) |
| ***H02J 3/14*** | (2006.01) |
| ***H02J 3/06*** | (2006.01) |
| *H02J 13/00* | (2006.01) |
| *H02M 1/00* | (2006.01) |

(52) U.S. Cl.
CPC ............ *H02J 7/02* (2013.01); *H02J 13/0079* (2013.01); *H02M 7/493* (2013.01); *H02M 7/70* (2013.01); *H02J 13/0096* (2013.01); *H02M 2001/0032* (2013.01); *H02M 2001/0054* (2013.01); *Y02B 70/1491* (2013.01); *Y02B 70/16* (2013.01); *Y02B 70/3225* (2013.01); *Y04S 20/222* (2013.01)

(58) Field of Classification Search
CPC .. H02J 7/02; H02J 13/0079; H02J 3/06; H02J 3/14; H02J 5/00; H02J 13/0096; Y02B 70/3225; Y02B 70/1491; Y02B 70/16; Y04S 20/222
See application file for complete search history.

(56) References Cited

U.S. PATENT DOCUMENTS

| | | | | |
|---|---|---|---|---|
| 2003/0007369 | A1* | 1/2003 | Gilbreth .................... | H02J 1/10 363/35 |
| 2011/0216562 | A1* | 9/2011 | Gengenbach ............. | H02J 3/18 363/71 |
| 2012/0010771 | A1 | 1/2012 | Kato et al. | |
| 2012/0173035 | A1 | 7/2012 | Abe | |
| 2013/0099581 | A1* | 4/2013 | Zhou ......................... | H02J 1/12 307/82 |

FOREIGN PATENT DOCUMENTS

| | | |
|---|---|---|
| JP | 2006-288162 | 10/2006 |
| JP | 2011-182641 | 9/2011 |
| JP | 4783453 | 9/2011 |
| JP | 2012-10530 | 1/2012 |

OTHER PUBLICATIONS

International Search Report dated Apr. 22, 2014 in corresponding PCT International Application.

* cited by examiner 100
115
114
VOLTAGE SENSOR
LEG 1
113
112
CURRENT SENSOR
111P
BL
111D
111
LEG 2
11
111T
19
CONTROL UNIT
$V_{101}$
VOLTAGE SENSOR
103
101

850
MANAGEMENT SERVER
851
811
821
832
831
835
833
POWER CELL 1
841
822
831
831
832
POWER CELL 2
842
843
823
POWER CELL 3
812
LARGE-SCALE POWER PLANT
844
824
831
835
834
POWER CELL 4
831

POWER ROUTER AND OPERATION CONTROL METHOD THEREOF, POWER NETWORK SYSTEM, AND NON-TRANSITORY COMPUTER READABLE MEDIA STORING PROGRAM

CROSS-REFERENCE TO RELATED PATENT APPLICATIONS

This application is a National Stage Entry of International Application No. PCT/JP2014/000347, filed Jan. 24, 2014, which claims priority from Japanese Patent Application No. 2013-013632, filed Jan. 28, 2013. The entire contents of the above-referenced applications are expressly incorporated herein by reference.

TECHNICAL FIELD

The present invention relates to a power router and an operation control method thereof, a power network system, and a non-transitory computer readable media storing program.

BACKGROUND ART

When a power supply system is constructed, in addition to a further expansion of a power distribution grid in a more stable way, a main issue has been providing such a system with a capability of introducing a large amount of natural energy. A power network system called Digital Grid (registered trademark) has been proposed as a new power network (see Patent literatures 1 and 2.

Digital Grid (registered trademark) is a power network system in which a power network is partitioned into small-sized cells and these cells are asynchronously interconnected. Each power cell may be small (e.g., a house, a building, or a commercial facility) or may be large (e.g., a prefecture or a municipality). Each power cell naturally includes a load, and may also include a power generation facility or a power storage system. The power generation facility may be, as an example, a power generation facility that uses natural energy generated by, for example, photovoltaic power, wind power, and geothermal power.

In order to freely generate power inside each power cell and to further smoothly interchange power among the power cells, the power cells are asynchronously connected. That is, even when the plurality of power cells are interconnected, a frequency, a phase, and a voltage of power used in each power cell is asynchronous with those used in other power cells.

FIG. 15 shows an example of a power network system 810. In FIG. 12, a utility grid 811 sends bulk power from a large-scale power plant 812. A plurality of power cells 821-824 are arranged. Each of the power cells 821-824 includes a load such as a house 831 and a building 832, power generation facilities (e.g., a solar panel 833 and an wind turbine 834), and a power storage system (e.g., a storage battery 835).

In the specification of the present application, power generation facilities and power storage systems are also collectively referred to as "distributed power supplies".

Further, the power cells 821-824 respectively include power routers 841-844 which serve as connection ports to be connected to other power cells or the utility grid 811. Each of the power routers 841-844 includes a plurality of legs (LEG). (Due to space constraints, the symbols for the legs are omitted in FIG. 15. It should be interpreted that the white circles attached to the power routers 841-844 are connection terminals of each leg.)

Now, each leg includes a connection terminal and a power conversion unit, and an address is attached to each leg. The power conversion by the leg means converting AC to DC or DC to AC and changing the phase, the frequency, and the voltage of the power.

All the power routers 841-844 are connected to a management server 850 by a communication network 851, and operations of all the power routers 841-844 are integrally controlled by the management server 850. For example, the management server 850 instructs each of the power routers 841-844 to transmit or receive power for each leg. Accordingly, power is interchanged among power cells through the power routers 841-844.

Since power interchange among the power cells is achieved, a plurality of power cells can share, for example, one power generation facility (e.g., the solar panel 833 and the wind turbine 834) or one power storage system (the storage battery 835). If an excessive power can be interchanged among the power cells, a supply-demand balance of power can be kept stable while greatly reducing the equipment cost.

CITATION LIST

Patent Literature

Patent Literature 1: Japanese Patent No. 4783453

Patent Literature 2: Japanese Unexamined Patent Application Publication No. 2011-182641

SUMMARY OF INVENTION

Technical Problem

If a plurality of power cells can be connected by their power routers in an asynchronous manner, this is significantly advantageous. Therefore, it has been desired to commercially implement power routers as soon as possible.

However, there is a particular problem, which the conventional power transmission/distribution facility does not have, for actually putting the power router to practical use. The currently mainstream power transmission/distribution supposes a power system in which voltage, phase, and frequency are completely synchronized, so that the power router connecting the power systems that have different voltage, phase, or frequency needs an attention for new problems.

The present invention has been made to solve the above-described problem and an object thereof is to manage a power router more appropriately when a power network system in which power cells are asynchronously connected with each other is constructed.

Solution to Problem

An aspect of the present invention is a power router including: a direct current bus in which a voltage thereof is maintained at a predetermined rating; a plurality of power conversion legs that bi-directionally converts power between a first connection terminal and a second connection terminal, the first connection terminal of the power conversion leg being connected with the direct current bus, the second connection terminal of the power conversion leg being connected with an external connection partner as an external connection terminal; and a control means for controlling operations of the plurality of power conversion legs. The control means: determines whether a stopping target leg can be stopped, based on a control instruction in which a designation of the stopping target leg that is a target of stopping in the plurality of power conversion legs is included, and stops the stopping target leg when the stopping target leg can be stopped.

An aspect of the present invention is a power network system including: one or more power routers; and a power system that is directly or indirectly connected with the power router. Each of the one or more power routers includes: a direct current bus the voltage of which is maintained at a predetermined rating; a plurality of power conversion legs that bi-directionally converts power between a first connection terminal and a second connection terminal, the first connection terminal of the power conversion leg being connected to the direct current bus, the second connection terminal of the power conversion leg being connected to an external connection partner as an external connection terminal; and a control means for controlling operations of the plurality of power conversion legs. The control means: determines whether a stopping target leg can be stopped, based on a control instruction in which a designation of the stopping target leg that is a target of stopping in the plurality of power conversion legs is included, and stops the stopping target leg when the stopping target leg can be stopped.

An aspect of the present invention is an operation control method of a power router, the power router including: a direct current bus the voltage of which is maintained at a predetermined rating; and a plurality of power conversion legs that bi-directionally converts power between a first connection terminal and a second connection terminal, the first connection terminal of the power conversion leg being connected to the direct current bus, the second connection terminal of the power conversion leg being connected to an external connection partner as an external connection terminal. In the power router, the method including: determining whether a stopping target leg can be stopped, based on a control instruction in which a designation of the stopping target leg that is a target of stopping in the plurality of power conversion legs is included, and stopping the stopping target leg when the stopping target leg can be stopped.

An aspect of the present invention is a power router operation control program, the power router including: a direct current bus the voltage of which is maintained at a predetermined rating; a plurality of power conversion legs that bi-directionally converts power between a first connection terminal and a second connection terminal, the first connection terminal of the power conversion leg being connected to the direct current bus, the second connection terminal of the power conversion leg being connected to an external connection partner as an external connection terminal; and a computer that configures a control means for controlling operations of the plurality of power conversion legs. The program causing the computer to execute: a process of determining whether a stopping target leg can be stopped, based on a control instruction in which a designation of the stopping target leg that is a target of stopping in the plurality of power conversion legs is included, and a process of stopping the stopping target leg when the stopping target leg can be stopped.

An aspect of the present invention is a management device control program including: one or more power routers; a power system that is directly or indirectly connected with the power router; and a computer that configures a management device controlling operations of the one or more power routers. Each of the one or more power routers includes: a direct current bus the voltage of which is maintained at a predetermined rating; a plurality of power conversion legs that bi-directionally converts power between a first connection terminal and a second connection terminal, the first connection terminal of the power conversion leg being connected to the direct current bus, the second connection terminal of the power conversion leg being connected to an external connection partner as an external connection terminal; and a control means for controlling operations of the plurality of power conversion legs. The program causes the computer to execute a process of outputting a control instruction including a designation of a stopping target leg that is a target leg to be stopped in the plurality of power conversion legs to the stopping target leg included in any one of the one or more power routers. The control means: determines whether a stopping target leg can be stopped, and stops the stopping target leg when the stopping target leg can be stopped.

Advantageous Effects of Invention

According to the present invention, it is possible to manage or control a power router more appropriately when a power network system in which power cells are asynchronously connected with each other.

DESCRIPTION OF EMBODIMENTS

Figure 1:
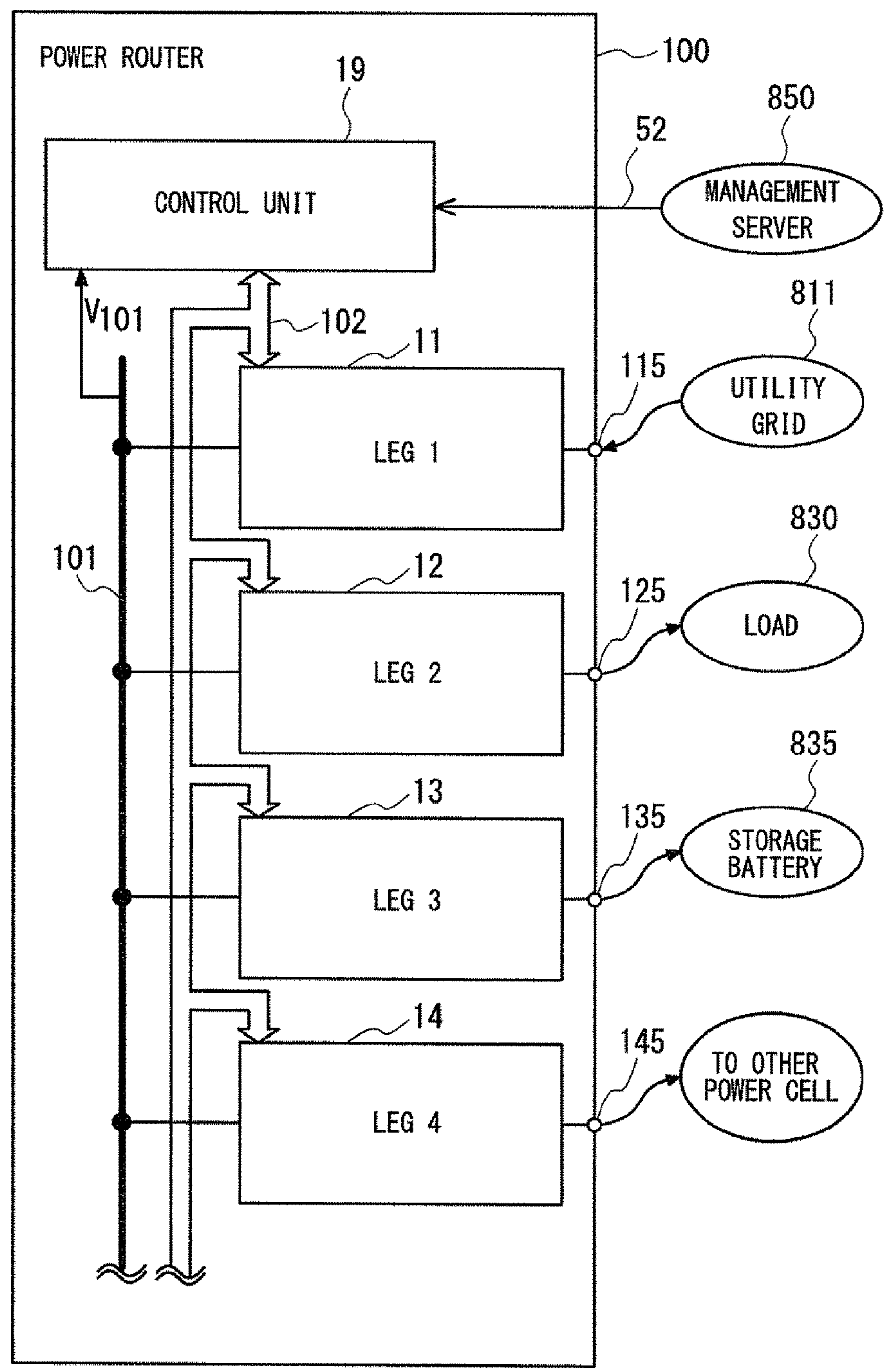
FIG. 1 is a block diagram illustrating a schematic configuration of a power router 100.

Exemplary embodiments of the present invention will be described below with reference to the drawings. A specific configuration of the above-described power router will be described in the following exemplary embodiments. In this regard, each exemplary embodiment by no means limits the present invention only to a power router, and it can be understood that the present invention includes other components such as a device in which the power router is embedded. The same elements will be assigned the same reference numerals in each drawing, and will not be described when necessary.

First Exemplary Embodiment

Figure 15:
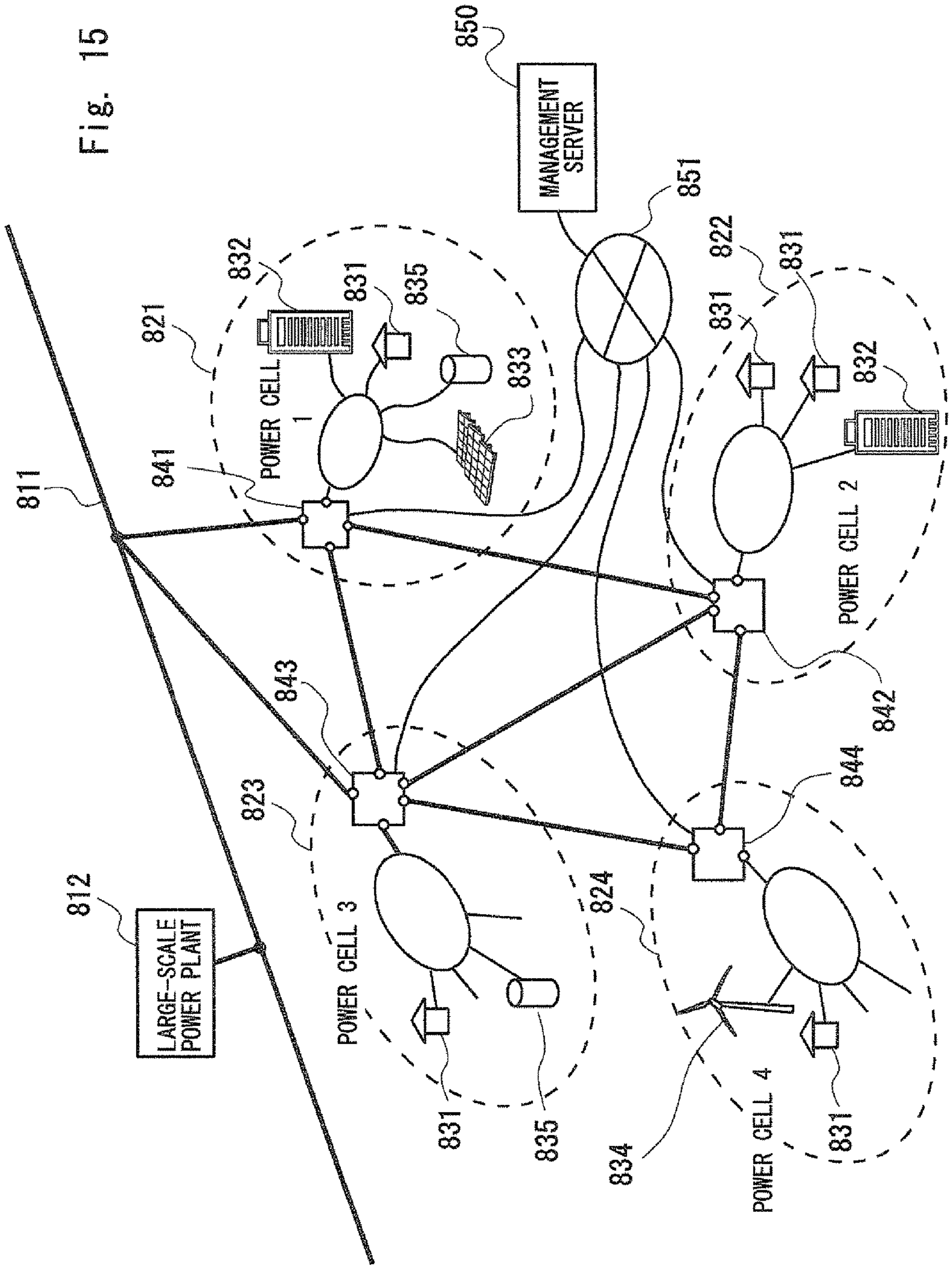
FIG. 15 shows an example of the power network system 810.

Stopping of a leg included in a power router will be described in the present exemplary embodiment. Here, a power router 100 according to a first exemplary embodiment will be firstly described. The power router 100 is a specific example of above power routers 841 to 844 (FIG. 15). FIG. 1 is a block diagram illustrating a schematic configuration of the power router 100. The power router 100 typically includes a direct current (DC) bus 101, a first leg 11, a second leg 12, a third leg 13, a fourth leg 14 and a control unit 19. In addition, in FIG. 1, the first leg to the fourth leg are indicated as a leg 1 to a leg 4, respectively, for convenience of the drawings.

The DC bus 101 is connected with the first leg 11 to the fourth leg 14 in parallel. The DC bus 101 is provided to enable DC power flow. The control unit 19 maintains a bus voltage $V_{101}$ of the DC bus 101 at a predetermined fixed value by controlling operation states of the first leg 11 to the fourth leg 14 (an operation of feeding power to an outside, an operation of receiving power from the outside and the like) through a communication bus 102. That is, the power router 100 is connected to the outside through the first leg 11 to the fourth leg 14. All the power to be exchanged with the outside is once converted into DC and the DC flows through the DC bus 101. Since power is once converted into DC, it is possible to asynchronously connect power cells even when frequencies, voltages or phases are different.

In addition, an example where the power router 100 includes four legs will be described in the present exemplary embodiment. However, the present exemplary embodiment is only exemplary. The power router can be provided with an arbitrary number of legs equal to or more than two legs. In the present exemplary embodiment, the first leg 11 to the fourth leg 14 employ the same configuration. However, the two or more legs included in the power router may employ the same configuration or different configurations. In addition, a leg will be also referred to as a power converting leg below.

Figure 2:
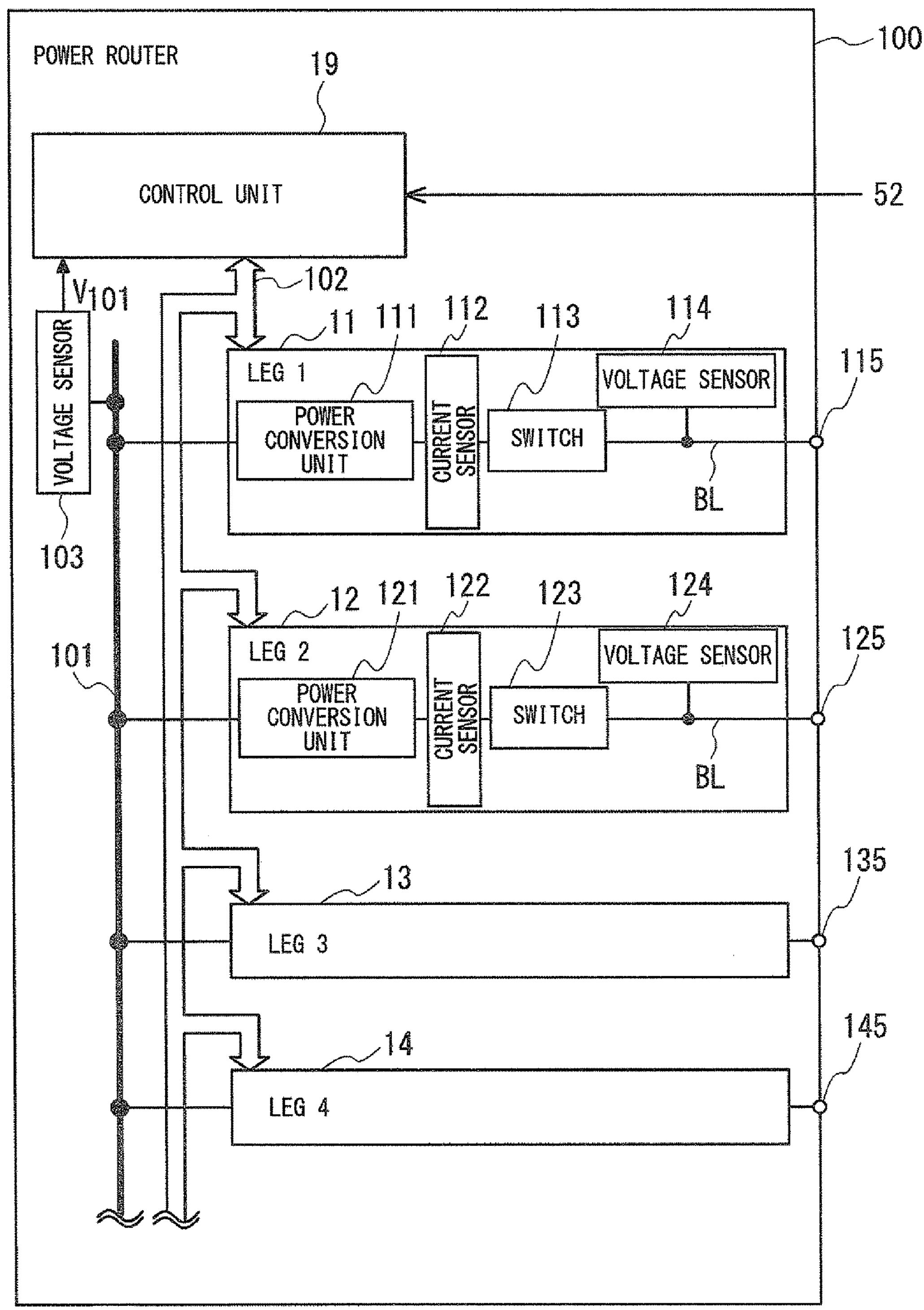
FIG. 2 is a block diagram of the power router 100 illustrating an example of internal structures of legs.
Figure 3:
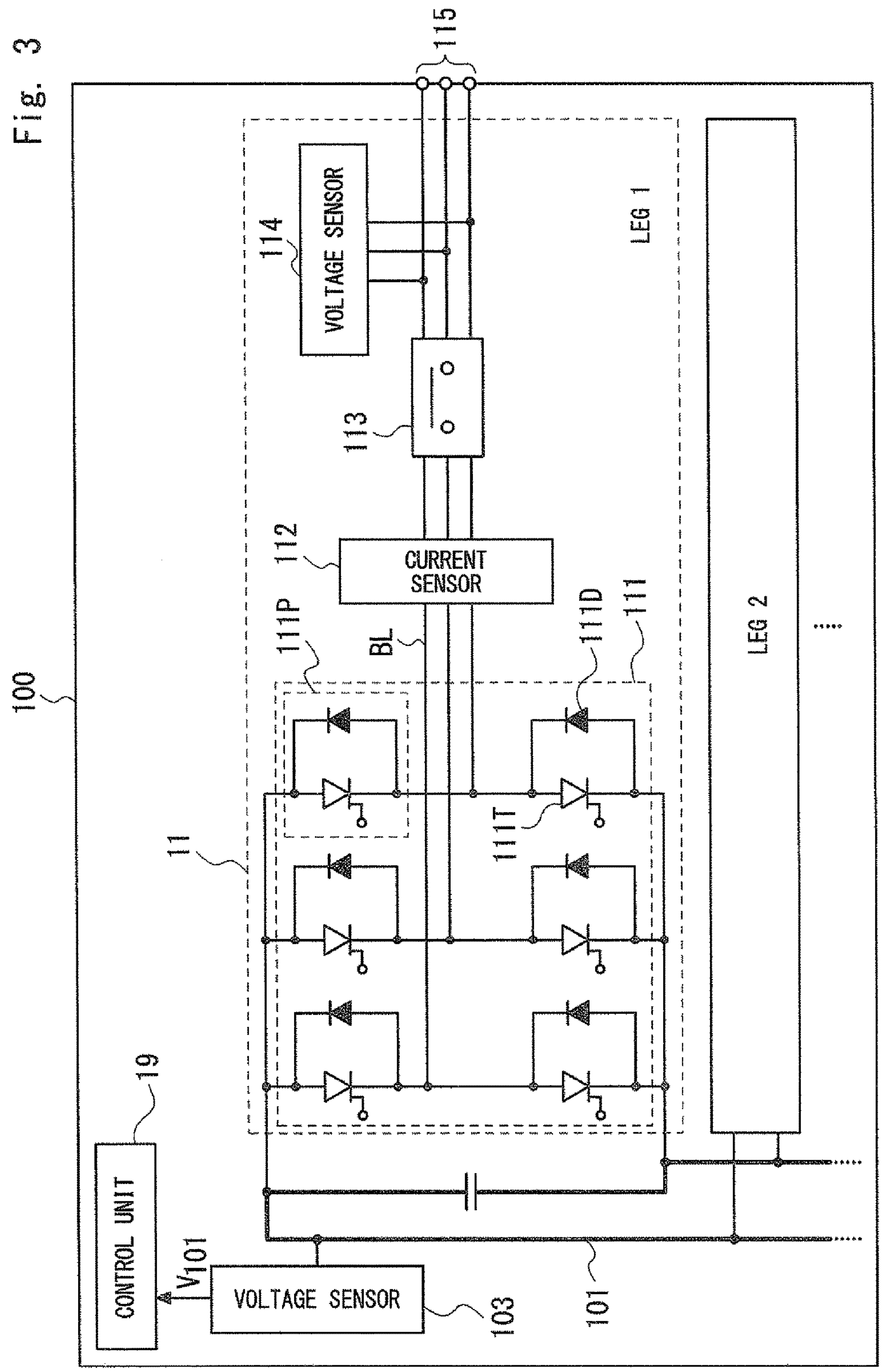
FIG. 3 is a block diagram of the power router 100 more specifically illustrating the internal structure of the leg.

Next, the first leg 11 to the fourth leg 14 will be described. FIG. 2 is a block diagram of the power router 100 illustrating an example of internal structures of the legs. The first leg 11 to the fourth leg 14 employ the same configuration. However, for simplification of the drawings, FIG. 2 illustrates the internal structures of the first leg 11 and the second leg 12, and does not illustrate the internal structures of the third leg 13 and the fourth leg 14. FIG. 3 is a block diagram of the power router 100 more specifically illustrating the internal structure of the leg. The first leg 11 to the fourth leg 14 employ the same configuration. However, for simplification of the drawings, FIG. 3 illustrates the internal structure of the first leg 11, and does not illustrate the internal structure of the second leg 12, the third leg 13, the fourth leg 14 and the communication bus 102.

The first leg 11 to the fourth leg 14 are provided to the DC bus 101 in parallel. As described above, the first leg 11 to the fourth leg 14 employ the same configuration. Hereinafter, a configuration of the first leg 11 will be typically described.

As illustrated in FIG. 2, the first leg 11 includes a power converting unit 111, a current sensor 112, a switch 113 and a voltage sensor 114. The first leg 11 is connected to, for example, a utility grid 811 through a connection terminal 115. The power converting unit 111 converts alternating current (AC) power into DC power or DC power into AC power. DC power flows in the DC bus 101, i.e., the power converting unit 111 converts the DC power of the DC bus 101 into AC power of a fixed frequency and voltage and flows the AC power to an outside from the connection terminal 115. Otherwise, the power conversion unit 111 converts AC power that flows from the connection terminal 115 into DC power to allow the DC power to flow through the DC bus 101.

The power conversion unit 111 has a configuration of an inverter circuit. More specifically, as illustrated in FIG. 3, the power converting unit 111 employs a configuration in which anti-parallel circuits 111P formed of thyristors 111T and feedback diodes 111D are three-phase bridge-connected. That is, one inverter circuit (power converting unit 111) includes the six antiparallel circuits 111P. A wire which is led from a node between the two antiparallel circuits 111P and connects this node with the connection terminal will be referred to as a branch line BL. A three-phase alternating current is used, and therefore one leg includes the three branch lines BL in this case. In this regard, a three-phase inverter circuit is used since the three-phase alternating current is used. However, a single-phase inverter circuit may be used depending on cases.

The switch 113 is disposed between the power converting unit 111 and the connection terminal 115. By opening and closing this switch 113, the branch line BL is opened and closed. Thus, the DC bus 101 is isolated from or connected with the outside. The current sensor 112 and the voltage sensor 114 output detection values to the control unit 19 through the communication bus 102.

While the power conversion unit is the inverter circuit and the connection partner of the leg uses AC as described above, the connection partner of the leg may instead use DC and may be, for example, a storage battery 835. (For example, in FIG. 1, the third leg 13 is connected to the storage battery 835.) Power conversion in this case is DC-DC conversion.

Accordingly, it is possible to provide an inverter circuit and a converter circuit in parallel in the power conversion unit and separately use the inverter circuit and the converter circuit depending on whether the connection partner is AC or DC.

Otherwise, a leg dedicated for DC-DC conversion in which the power conversion unit is a DC-DC conversion unit may be provided.

In addition, it will be often advantageous in terms of the size and the cost to use a power router that includes both a leg dedicated for AC-DC conversion and a leg dedicated for DC-DC conversion instead of providing the inverter circuit and the converter circuit in parallel in each leg.

The second leg 12 includes a power converting unit 121, a current sensor 122, a switch 123 and a voltage sensor 124. The leg 12 is connected to, for example, a load 830 through a connection terminal 125. The power converting unit 121, the current sensor 122, the switch 123 and the voltage sensor 124 of the second leg 12 correspond to the power converting unit 111, the current sensor 112, the switch 113 and the voltage sensor 114 of the first leg 11, respectively. The connection terminal 125 connected with the second leg 12 corresponds to the connection terminal 115 connected with the first leg 11. The power converting unit 121 employs a configuration in which antiparallel circuits 121P each including a thyristor 121T and a feedback diode 121D are connected by way of a three-phase bridge. The thyristor 121T, the feedback diode 121D and the antiparallel circuit 121P correspond to the thyristor 111T, the feedback diode 111D and the antiparallel circuit 111P, respectively.

The third leg 13 includes a power converting unit 131, a current sensor 132, a switch 133 and a voltage sensor 134. The third leg 13 is connected to, for example, the battery 835 through a connection terminal 135. The power converting unit 131, the current sensor 132, the switch 133 and the voltage sensor 134 of the third leg 13 correspond to the power converting unit 111, the current sensor 112, the switch 113 and the voltage sensor 114 of the first leg 11, respectively. The connection terminal 135 connected with the third leg 13 corresponds to the connection terminal 115 connected with the first leg 11. The power converting unit 131 employs a configuration in which antiparallel circuits 131P each including a thyristor T and a feedback diode 131D are connected by way of a three-phase bridge. The thyristor 131T, the feedback diode 131D and the antiparallel 131P correspond to the thyristor 111T, the feedback diode 111D and the antiparallel circuit 111P, respectively. In this regard, for simplification of the drawings, the internal structure of the third leg 13 is not illustrated in FIGS. 2 and 3.

The fourth leg 14 includes a power converting unit 141, a current sensor 142, a switch 143 and a voltage sensor 144. The fourth leg 14 is connected to, for example, another power cell through a connection terminal 145. The power converting unit 141, the current sensor 142, the switch 143 and the voltage sensor 144 of the fourth leg 14 correspond to the power converting unit 111, the current sensor 112, the switch 113 and the voltage sensor 114 of the first leg 11, respectively. The connection terminal 145 connected with the fourth leg 14 corresponds to the connection terminal 115 connected with the first leg 11. The power converting unit 141 employs a configuration in which antiparallel circuits 141P each including a thyristor 141T and a feedback diode 141D are connected by way of a three-phase bridge. The thyristor 141T, the feedback diode 141D and the antiparallel circuit 141P correspond to the thyristor 111T, the feedback diode 111D and the antiparallel circuit 111P, respectively. In this regard, for simplification of the drawings, the internal structure of the fourth leg 14 is not illustrated in FIGS. 2 and 3.

The control unit 19 receives a control instruction 52 from the external management server 850 through the communication network 851. The control instruction 52 includes information for instructing an operation of each leg of the power router 100. In addition, the operation instruction of each leg includes, for example, a designation of power transmission/power reception, a designation of an operation mode and a designation of power to be transmitted or received.

More specifically, the control unit 19 monitors the bus voltage $V_{101}$ of the DC bus 101 through a voltage sensor 103, and controls a power direction, a frequency of AC power and the like. That is, the control unit 19 controls switching of the thyristors 111T, 121T and 131T and opening/closing of the switches 113, 123, 133 and 143 through the communication bus 102.

Figure 4:
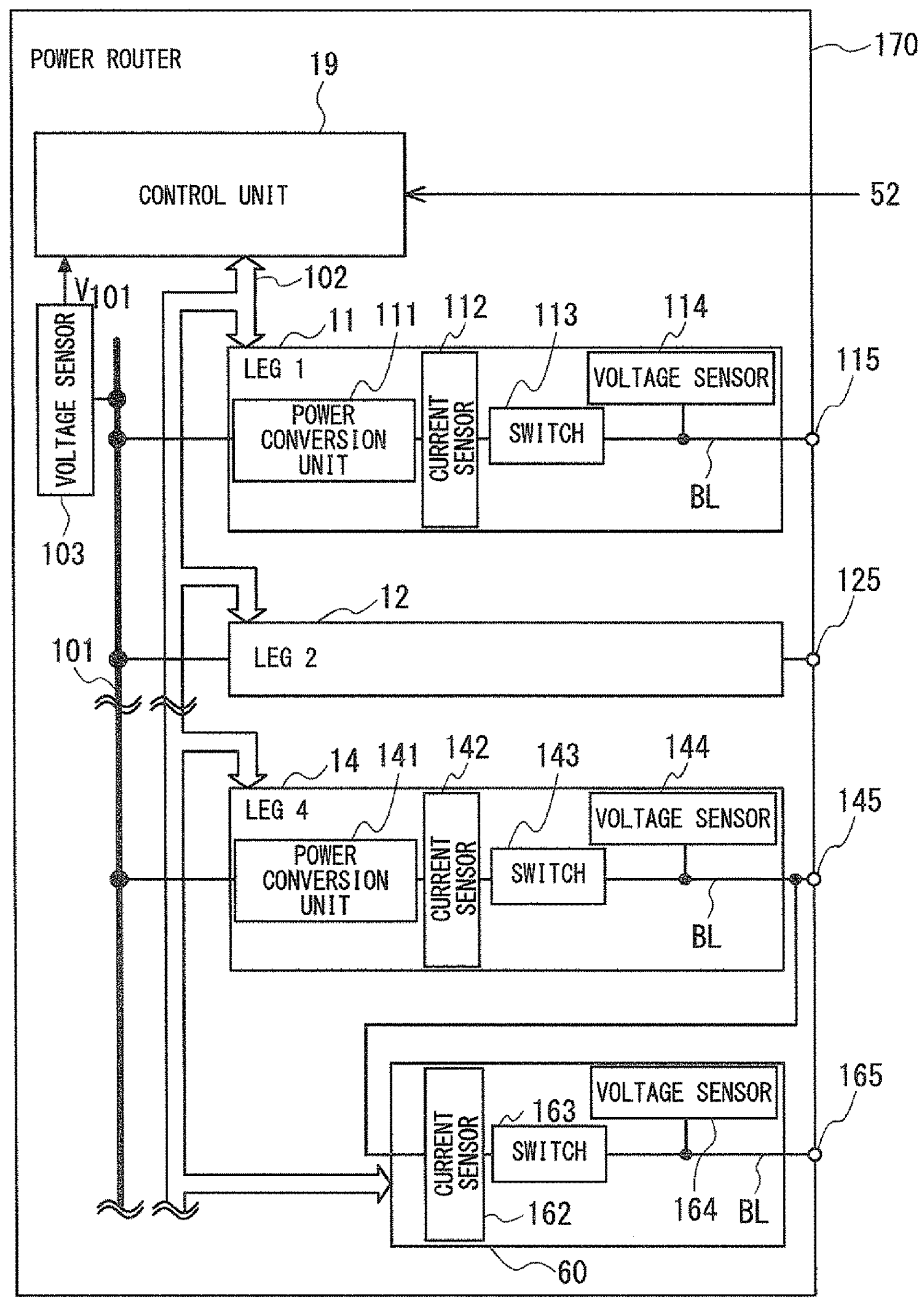
FIG. 4 is a block diagram illustrating a configuration example of a power router 170 including an AC through leg 60.

In addition, the leg having the power converting unit has been described above. However, it is also possible to provide a leg without a power converting unit. Hereinafter, the leg without the power converting unit will be temporarily referred to as an AC (Alternating Current) through leg 60. FIG. 4 is a block diagram illustrating a configuration example of a power router 170 including the AC through leg 60. The power router 170 employing a configuration provided by adding the AC through leg 60 to the power router 100 will be described. In addition, for simplification of the drawings, the third leg 13 is not illustrated in FIG. 4.

The AC through leg 60 includes a current sensor 162, a switch 163 and a voltage sensor 164. The AC through leg 60 is connected to, for example, another power cell through a connection terminal 165. A branch line BL of the AC through leg 60 is connected to the branch line BL of another leg having the power converting unit through the switch 163. That is, the connection terminal 165 connected with the AC through leg 60 is connected to a connection terminal connected with another leg including the power converting unit. FIG. 4 illustrates that, for example, the connection terminal 165 connected with the AC through leg 60 is connected to the connection terminal 145 connected with the fourth leg 14. Only the switch 163 is provided between the connection terminal 165 of the AC through leg 60 and the connection terminal 145 connected with the fourth leg 14, and the AC through leg 60 does not include a power converter. Hence, power is conducted without being converted at all between the connection terminal 165 connected with the AC through leg 60 and the connection terminal 145 connected with the fourth leg 14. Therefore, the leg without a power converter is referred to as an AC through leg.

Figure 5:
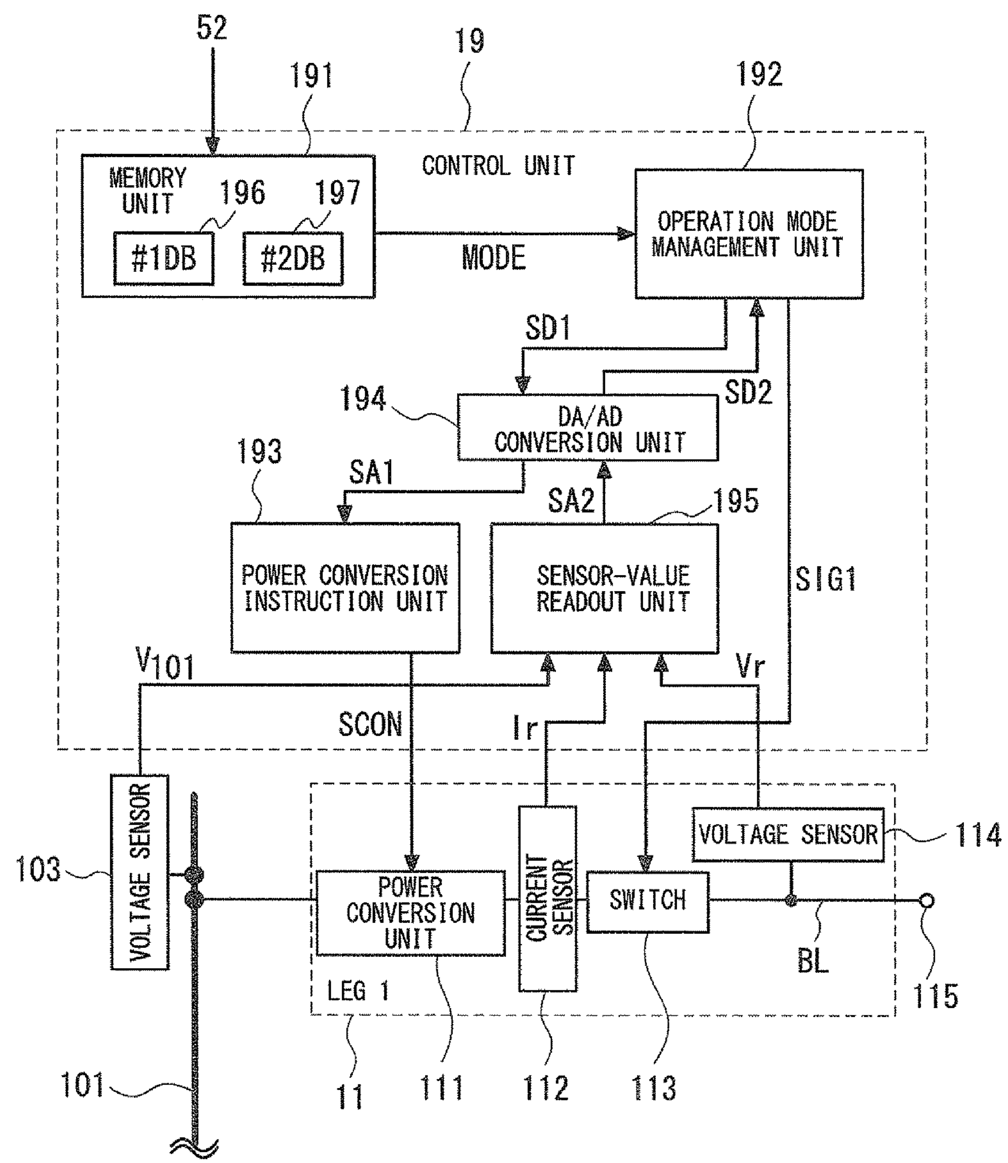
FIG. 5 is a block diagram schematically showing a relation between a configuration of a control unit 19 and a stopping target leg.

FIG. 5 is a block diagram schematically showing a relation between a configuration of the control unit 19 and a stopping target leg. In FIG. 5, the case where the first leg 11 is designated as the stopping target leg is represented. The control unit 19 includes a memory unit 191, an operation mode management unit 192, a power conversion instruction unit 193, a DA/AD conversion unit 194, and a sensor-value readout unit 195.

The memory unit 191 holds the control instruction 52 from the management server 850 as a control instruction database 196 (a first database, which is represented by #1DB in the drawings). The memory unit 191 holds a leg identification information database 197 (a second database, which is represented by #2DB in the drawings) for identifying each of the first leg 11 to the fourth leg 14 as well as the control instruction database 196. The memory unit 191 can be achieved by various types of the memory unit such as a flash memory, etc. The leg identification information database 197 is information, e.g., an IP address, URL, URI and so on, allocated for specifying each of the first leg 11 to the fourth leg 14.

The operation mode management unit 192 is configured by a CPU, for example. The operation mode management unit 192 reads out an operation mode designation information MODE, which is included in the control instruction database 196 and designates an operation mode (the operation mode will be described below) of the stopping target leg (the first leg 11). The operation mode management unit 192 also refers to the leg identification information database 197 in the memory unit 191 and reads out information (e.g., the IP address) corresponding to the stopping target leg (the first leg 11). Thus, the operation mode management unit 192 can output an activation instruction with respect to the stopping target leg (the first leg 11). The operation mode management unit 192 outputs a waveform instruction signal SD1 that is a digital signal. Further, the operation mode management unit outputs a switching control signal SIG1 to the switch (e.g., the switch 113) in the stopping target leg.

The waveform instruction signal SD1 is converted from digital to analog in the DA/AD conversion unit 194, and the converted signal is output to the power conversion instruction unit 193 as a waveform instruction signal SA1 that is an analog signal. The power conversion instruction unit 193 outputs a control signal CON to the power converting unit (e.g., the power converting unit 111) according to the waveform instruction signal SA1.

The sensor-value readout unit 195 reads the bus voltage $V_{101}$ detected by the voltage sensor 103, and a detected value Ir of the current sensor 112 and a detected value Vr of the voltage sensor 114 in the stopping target leg (the first leg 11). The sensor-value readout unit 195 outputs a readout result as a readout signal SA2 that is an analog signal. The readout signal SA2 is converted from analog to digital in the DA/AD conversion unit 194, and the converted signal is output to the operation mode management unit 192 as a readout signal SD2 that is a digital signal.

Next, an operation of the power router 100 will be described. In the present exemplary embodiment, an operation mode designation of each leg is included in the control instruction 52.

First, the operation mode will be described. As previously described, the first leg 11 to the fourth leg 14 include the power converting unit 111, 121, 131, and 141, and the switching operations of the thyristors in the power conversion units are controlled by the control unit 19.

The power router 100 is in the node of the power network system 810, and plays an important role of connecting the utility grid 811, the load 830, a distributed power supply, power cells and the like. At this time, the connection terminals 115, 125, 135, and 145 of the first leg 11 to the fourth leg 14 are connected to the utility grid 811, the load 830, the distributed power supply, and power routers of other power cells. The present inventors have noticed that the first leg 11 to the fourth leg 14 have different roles depending on the connection partner and the power routers are not appropriately operated unless each of the first leg 11 to the fourth leg 14 is appropriately operated according to each of their respective roles. While the legs have the same configuration, the present inventors have changed the method of operating the legs depending on the connection partner.

The method of operating the legs is called an operation mode.

The present inventors have prepared three types of operation modes of the legs, and the modes are switched according to the connection partner.

The operation modes of the legs include:

a master mode;

a stand-alone mode; and a designated power transmission/reception mode.

In the following description, these operation modes will be described in series.

(Master Mode)

The master mode is an operation mode when a leg is connected to a stable power supply source such as an electrical grid, and is an operation mode to keep the voltage of the DC bus 101. In FIG. 1, an example in which the connection terminal 115 of the first leg 11 is connected to the utility grid 811 is shown. In the case of FIG. 1, the operation of the first leg 11 is controlled as a master mode, and plays a role of keeping the voltage $V_{101}$ of the DC bus 101. While many other of the second leg 12 to the fourth leg 14 are connected to the DC bus 101, power may flow into the DC bus 101 from the second leg 12 to the fourth leg 14 or may flow out from the second leg 12 to the fourth leg 14. When the power flows out through the DC bus 101 and the voltage $V_{101}$ of the DC bus 101 decreases from the rated voltage, the leg first 11 which is in the master mode supplements an insufficient amount of power due to the outflow from the connection partner (in this example, the utility grid 811). On the other hand, when the power flows into the DC bus 101 and the voltage $V_{101}$ of the DC bus 101 increases from the rated voltage, the first leg 11 which is in the master mode transfers an excessive amount of power due to the inflow to the connection partner (in this example, the utility grid 811). The first leg 11 which is in the master mode is therefore able to keep the voltage $V_{101}$ of the DC bus 101.

Accordingly, in one power router, at least one leg needs to be operated in the master mode. Otherwise, the voltage $V_{101}$ of the DC bus 101 is not kept constant. In one power router, two or more legs may be operated in the master mode. It is preferable, however, that only one leg be operated in the master mode in one power router.

Further, the leg which is in the master mode may be connected to, for example, the distributed power supply (also including the storage battery) on which a self-commutated inverter is mounted instead of being connected to the utility grid. It is impossible, however, to connect the leg which is in the master mode and the distributed power supply on which an externally commutated inverter is mounted.

In the following description, the leg operated in the master mode may be referred to as a master leg.

The operation control of the master leg will be described. The master leg is started as follows.

First, the switch 113 is set to the opened (broken) state. In this state, the connection terminal 115 is connected to the connection partner. In this embodiment, the connection partner is the utility grid 811.

The voltage sensor 114 measures the voltage of the utility grid of the connection partner and obtains the phase, the frequency, and the amplitude of the voltage of the utility grid using a phase-locked loop (PLL) or the like. After that, the output of the power conversion unit 111 is adjusted so that the voltage of the phase, the frequency, and the amplitude that are obtained is outputted from the power conversion unit 111. That is, the ON/OFF patterns of the thyristors 111T are determined. When this output is made stable, the switch 113 is turned on and the power conversion unit 111 and the utility grid 811 are connected. Since the output of the power conversion unit 111 and the voltage of the utility grid 811 are synchronized at this point, the current does not flow.

The operation control when the master leg is operated will be described.

The bus voltage $V_{101}$ of the DC bus 101 is measured by the voltage sensor 103. When the bus voltage $V_{101}$ of the DC bus 101 exceeds a predetermined rated bus voltage, the power conversion unit 111 is controlled so that power is sent from the master leg (the first leg 11) to the utility grid 811. (At least one of the phase and the amplitude of the voltage outputted from the power conversion unit 111 is adjusted so that power is sent from the DC bus 101 to the utility grid 811 through the master leg (the first leg 11).) The rated voltage of the DC bus 101 is predetermined.

On the other hand, when the bus voltage $V_{101}$ of the DC bus 101 is below the predetermined rated bus voltage, the power conversion unit 111 is controlled so that the master leg (the first leg 11) is able to receive power from the utility grid 811. (At least one of the phase and the amplitude of the voltage outputted from the power conversion unit 111 is adjusted so that power is sent from the utility grid 811 to the DC bus 101 through the master leg (the first leg 11).) It will be understood that, according to the operation of the master leg as described above, the bus voltage $V_{101}$ of the DC bus 101 can be kept to the predetermined rated voltage.

(Stand-Alone Mode)

The stand-alone mode is an operation mode in which a leg generates a voltage of the amplitude and the frequency specified by the management server 850 by itself, and sends power to and receives power from the connection partner.

The stand-alone mode is, for example, an operation mode to supply power to a device such as the load 830 that consumes power. Alternatively, the stand-alone mode is an operation mode to directly receive power sent from the connection partner.

FIG. 1 shows an example in which the connection terminal 125 of the second leg 12 is connected to the load 830. The operation of the second leg 12 is controlled as the stand-alone mode and power is supplied to the load 830.

Further, when a leg is connected to another power router as in the fourth leg 14, the fourth leg 14 may be operated in the stand-alone mode as a mode to send energy required by the other power router.

Alternatively, when a leg is connected to another power router as in the fourth leg 14, the fourth leg 14 may be operated in the stand-alone mode as a mode to receive power sent from the other power router.

While it is not illustrated in the drawings, the second leg can be operated in the stand-alone mode also in a case in which the second leg is connected to a power generation facility in place of the load 830. In this case, however, an externally commutated inverter is installed in the power generation facility.

The operation mode when the power routers are connected to each other will be described later.

The leg operated in the stand-alone mode is called a stand-alone leg. In one power router, a plurality of stand-alone legs may be provided.

The operation control of the stand-alone leg will be described.

First, a switch 123 is opened (broken). The connection terminal 125 is connected to the load 830. The management server 850 notifies the power router 100 of the amplitude and the frequency of the power (voltage) that should be supplied to the load 830. The control unit 19 causes the power (voltage) of the specified frequency and the specified amplitude to be outputted from the power conversion unit 121 to the load 830. (In short, the ON/OFF patterns of the thyristors 121T are determined.) When this output becomes stable, the switch 123 is turned on to connect the power conversion unit 121 and the load 830. Lastly, when the power is consumed in the load 830, the power corresponding to the consumed amount flows out to the load 830 from the stand-alone leg (the second leg 12).

(Designated Power Transmission/Reception Mode)

A designated power transmission/reception mode is an operation mode for transmitting or receiving a designated energy. Specifically, the designated power transmission/reception mode includes a case in which the designated power is transmitted to the connection partner and a case in which the designated power is received from the connection partner.

In FIG. 1, the fourth leg 14 is connected to other power routers.

In such a case, a predetermined energy is fed from the fourth leg 14 to the other power router or from the other power router to the fourth leg 14.

Alternatively, the third leg 13 is connected to the storage battery 835.

In such a case, a predetermined energy is sent to the storage battery 835 to charge the storage battery 835.

Further, the designated power transmission/reception leg and the distributed power supply (also including the storage battery) on which a self-commutated inverter is mounted may be connected. However, the designated power transmission/reception leg and the distributed power supply on which an externally commutated inverter is mounted cannot be connected.

The leg operated in the designated power transmission/reception mode is called a designated power transmission/reception leg. In one power router, a plurality of designated power transmission/reception legs may be provided.

The operation control of the designated power transmission/reception leg will be described. Since the control when the designated power transmission/reception leg is started is basically the same as that when the master leg is started, a description thereof will be omitted.

The operation control when the designated power transmission/reception leg is operated will be described. In the following description, symbols attached to the components of the third leg 13 will be used.

A voltage sensor 134 measures the voltage of the electrical grid of the connection partner to obtain the phase and the frequency of the voltage of the connection partner using a phase-locked loop (PLL) or the like. The target value of the current that the power conversion unit 131 receives or outputs is obtained based on an active power value and a reactive power value specified by the management server 850 and the phase and the frequency of the voltage of the connection partner. A current sensor 132 measures the current value of the current. The power conversion unit 131 is adjusted so that the current corresponding to the difference between the target value and the current value is additionally output. (At least one of the phase and the amplitude of the voltage outputted from the power conversion unit 131 is adjusted so that a desired power flows between the designated power transmission/reception leg and the connection partner.)

From the above description, it will be understood that the first leg 11 to the fourth leg 14 having the same configuration can play roles having three different patterns according to the method of the operation control.

The power router 100 can cause each leg to operate in the three operation modes described above by referring to the operation mode designation information included in the control instruction 52. Thus, the power router 100 can cause each leg to appropriately operate according to the function thereof.

Subsequently, a specific stopping procedure of the leg is described above. It is necessary to stop the leg that is in operation to adequately operate the power router 100 described above as appropriate. It is possible to stop the power router itself and change the operation mode of the leg in the case of capable of stopping the leg in operation.

Figure 6:
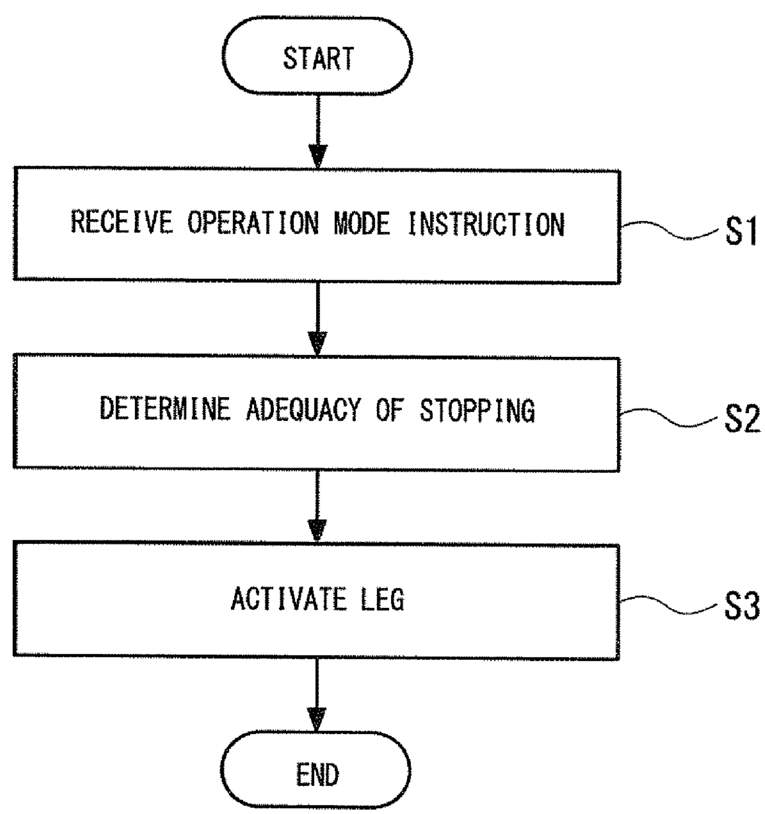
FIG. 6 is a flow chart showing a stopping procedure of the stopping target leg in the power router 100.

The stopping target leg (the first leg 11) needs to be normally stopped according to a stopping instruction for the stopping target leg (the first leg 11) included in the control instruction 52 when the power router that has been already operated in any operation mode is stopped. In the present exemplary embodiment, the management server 850 designates the stopping target leg (the first leg 11) by the control instruction 52. The control unit 19 stops the designated stopping target leg (the first leg 11). FIG. 6 is a flow chart showing a stopping procedure of the stopping target leg (the first leg 11) in the power router 100. The stopping procedure of the leg in the power router consists of a stopping instruction reception step S1, a stopping adequacy determination step S2, and a leg stopping step S3.

Stopping Instruction Reception Step S1

The control unit 19 receives stopping instruction information STOP included the control instruction 52 output from the management server 850. Specifically, the operation mode management unit 192 reads out the stopping instruction information STOP included in the control instruction database 196 in the memory unit 191.

Stopping Adequacy Determination Step S2

The control unit 19 checks whether there is a leg that has already performed a stopping operation other than the stopping target leg (the first leg 11) designated by the stopping instruction information STOP. Then, the operation mode management unit 192 determines whether an operation mode of the stopping target leg (the first leg 11) is the master mode. Then, an operation for switching the leg other than the stopping target leg (the first leg 11) to the master mode is performed.

Leg Stopping Step S3

The control unit 19 sets necessary information for stopping the stopping target leg (the first leg 11) in the designated operation mode to the stopping target leg (the first leg 11). Then, the management server 850 is notified whether the stopping is finished is notified.

Figure 7:
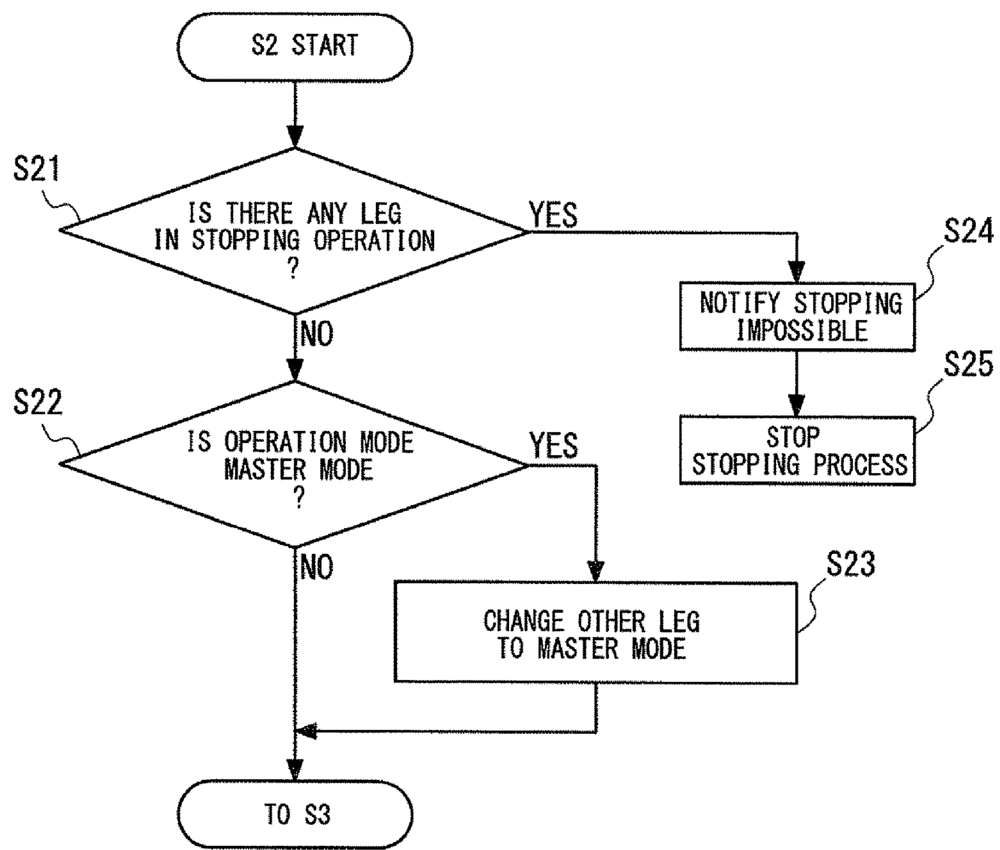
FIG. 7 is a flow chart showing a procedure of a stopping adequacy determination step S2.

Subsequently, detail of the stopping adequacy determination step S2 will be described. FIG. 7 is a flow chart showing a procedure of a stopping adequacy determination step S2. The stopping adequacy determination step S2 consists of a stopping possibility determination step S21, an operation mode determination step S22, a master mode leg generation step S23, a stopping impossibility notification step S24, and a stopping process stopping step S25.

Stopping Possibility Determination Step S21

The operation mode management unit 192 checks whether there is not a leg that has already performed the stopping operation other than the stopping target leg (the first leg 11) designated by the stopping instruction information STOP. Specifically, the operation mode management unit 192 refers to the control instruction database 196 in the memory unit 191 to check whether there is a leg that has already performed the stopping operation.

Operation Mode Determination Step S22

When there is not a leg that has already performed the stopping operation, the operation mode management unit 192 checks whether the operation mode of the stopping target leg (the first leg 11) designated by the stopping instruction information STOP is the master mode.

Master Mode Leg Generation Step S23

When the operation mode of the stopping target leg (the first leg 11) is the master mode, the operation mode management unit 192 switches another leg, which is other than the stopping target leg (the first leg 11), to the master mode. Existence of the master mode leg is necessary to adequately operate the power router 100 as described above. Therefore, when the stopping target leg (the first leg 11) is the master mode leg, another master mode leg needs to be prepared. Thus, the power router 100 performs a process for preparing another master mode leg by the master mode leg generation step S23.

Stopping Impossibility Notification Step S24

When there is a leg that has already performed the stopping operation, the operation mode management unit 192 notifies the management server 850 of an impossibility of the stopping.

Stopping Process Stopping Step S25

The operation mode management unit 192 stops the stopping process since the stopping target leg (the first leg 11) cannot be stopped.

Figure 8:
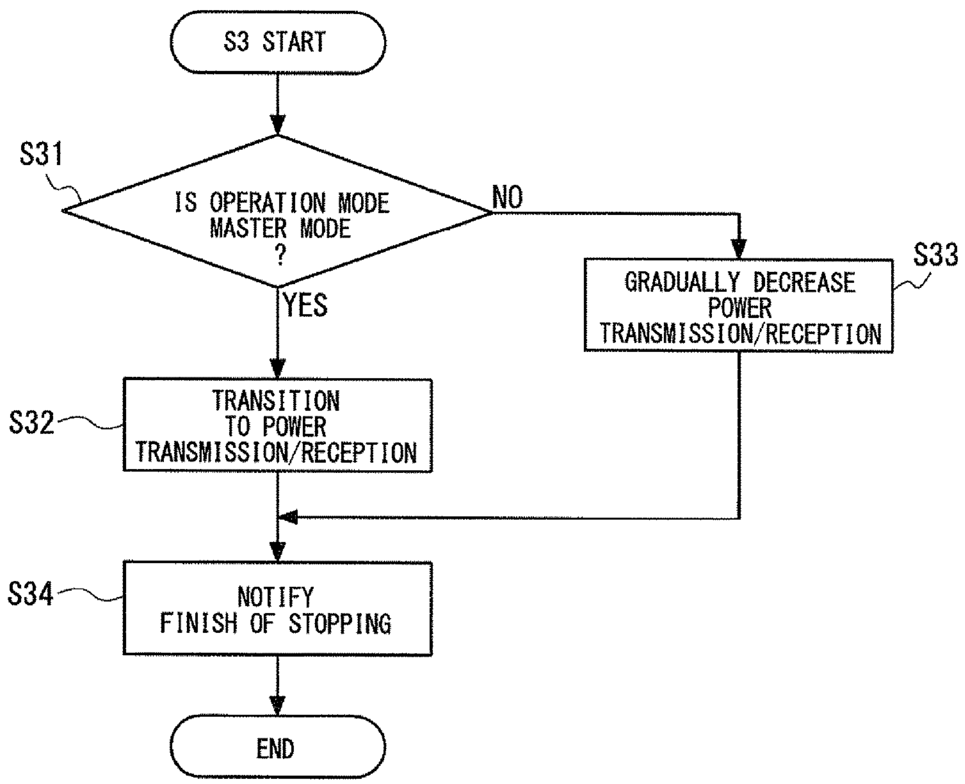
FIG. 8 is a flow chart showing a procedure of a leg stopping step S3.

Subsequently, detail of the leg stopping step S3 will be described. FIG. 8 is a flow chart showing a procedure of the leg stopping step S3. The leg stopping step S3 consists of an operation mode determination step S31, a power transmission/reception transition step S32, a power transmission/reception gradual reduction step S33, and a finish of the stopping notification step S34.

Operation Mode Determination Step S31

The operation mode management unit 192 checks whether the operation mode of the stopping target leg (the first leg 11) designated by the stopping instruction information STOP is the master mode.

Power Transmission/Reception Transition Step S32

When the operation mode of the stopping target leg (the first leg 11) is the master mode, the operation mode management unit 192 issues an instruction to the power conversion unit 111 in the stopping target leg (the first leg 11) and gradually reduces a transmission/reception power to zero. Simultaneously, the operation mode management unit 192 gradually increases a transmission/reception power of the new leg prepared in the master mode leg generation step S23 and transfers a master leg function which the stopping target leg (the first leg 11) is in charge of.

Power Transmission/Reception Gradual Reduction Step S33

When the operation mode of the stopping target leg (the first leg 11) is not the master mode, the operation mode management unit 192 issues the instruction to the power conversion unit 111 in the stopping target leg (the first leg 11) and gradually reduces a transmission/reception power to zero.

Finish of Stopping Notification Step S34

The operation mode management unit 192 notifies the management server 850 that the stopping of the stopping target leg (the first leg 11) is finished, and finishes the process.

As described above, the power router 100 can stop the stopping target leg designated by the stopping instruction from a plurality of the legs to achieve the stopping instruction of the management server 850. Specifically, the power router 100 receives the control instruction 52 from the management server 850 by the control unit 19. The received control instruction 52 is stored in the memory unit 191 in the control unit 19 as the control instruction database 196 and read out by the operation mode management unit 192. The operation mode management unit 192 can specifically designate the stopping target leg by checking the control instruction database 196 against the leg identification information database 197. Then, the operation mode management unit 192 can stop the stopping target leg. That the power router 100 receives the control instruction 52 from the management server 850 is described above. However, the operation mode management unit 192 does not receive the control instruction 52 from the management server 850 and the power router 100 can hold the control instruction 52 in advance. Specifically, the memory unit 191 may hold the control instruction data base 101 and a control instruction schedule representing the hourly control instruction 52. The control unit 19 may also generate the control instruction 52 and send the generated control instruction 52 to the operation mode management unit 192.

Therefore, according to the configuration, it is possible to specifically provide the power router capable of stopping the stopping target leg disposed in the power router based on the control instruction 52.

Further, the power router 100 can notify the management server 850 whether the designated stopping target leg can be stopped. Thus, the management server 850 can consider whether the stopping target leg can be stopped, and activate another leg in the master mode as appropriate. Thus, it is possible to control to cause the master mode leg to regularly exist in the power router.

Second Exemplary Embodiment

Next, a power router 200 according to a second exemplary embodiment will be described. The power router 200 is a modification of the power router 100 according to the first exemplary embodiment. The power router 200 can further change the operation mode after the stopping target leg described in the first exemplary embodiment is stopped. That is, in the power router 200, a process to activate the stopped leg in the operation mode designated by the management server 850 is performed after the stopping target leg is stopped. Since a configuration and the stopping operation of the stopping target leg the power router 200 are similar to those of the power router 100, descriptions of those will be omitted.

Figure 9:
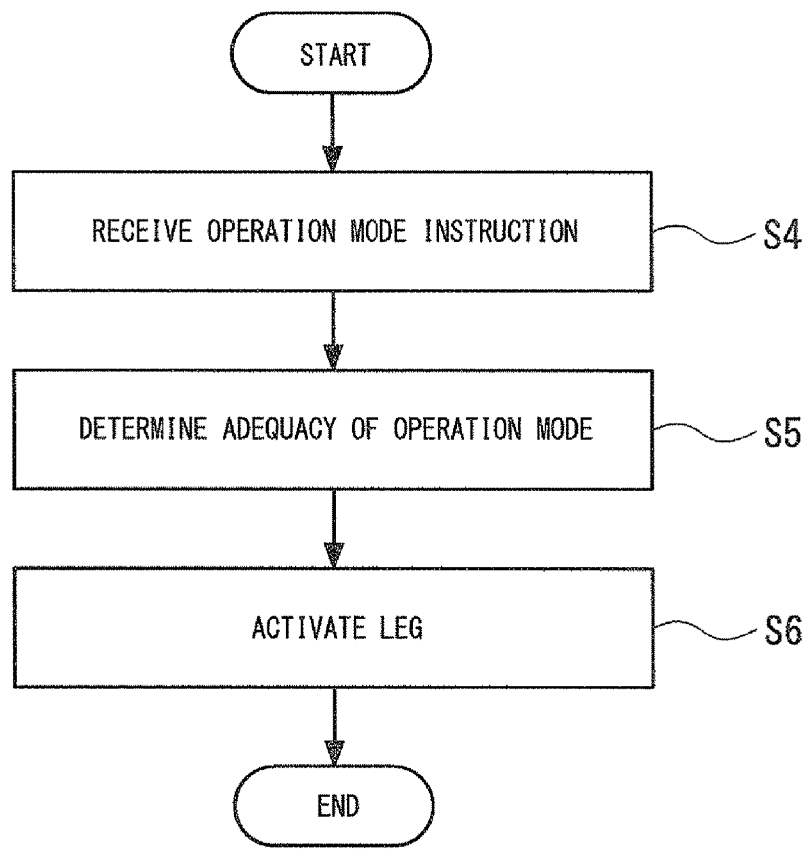
FIG. 9 is a flow chart showing a procedure of an activation of a power conversion leg in a power router 200.

Subsequently, a specific procedure of activation after the leg is stopped when the operation mode is changed will be described. In the present exemplary embodiment, the management server 850 designates the operation mode in a manner that the stopping target leg is an activation target leg (the first leg 11). FIG. 9 is a flow chart showing a procedure of activation of a power conversion leg in a power router 200. The procedure of activation consists of an operation mode instruction reception step S4, an operation mode adequacy determination S5, and a leg activation step S6.

Operation Mode Instruction Reception Step S4

The control unit 19 receives the operation mode designation information MODE included in the control instruction 52 output from the management server 850. Specifically, the operation mode management unit 192 reads out the operation mode designation information MODE included in the control instruction database 196 in the memory unit 191. Thus, it is possible to figure out which operation mode the activation target leg should be switched to.

Operation Mode Adequacy Determination S5

The control unit 19 determines which of the master mode, the stand-alone mode, and the designated power transmission/reception mode is the operation mode of the activation target leg (the first leg 11) designated by the operation mode designation information MODE. Then, the control unit 19 determines whether the activation target leg (the first leg 11) can be activated in the designated operation mode.

Leg Activation Step S6

The control unit 19 sets information necessary for outputting the power from the activation target leg (the first leg 11) in the designated operation mode to the activation target leg (the first leg 11). Then, the control unit 19 notifies the management server 850 whether the activation is finished.

Figure 10:
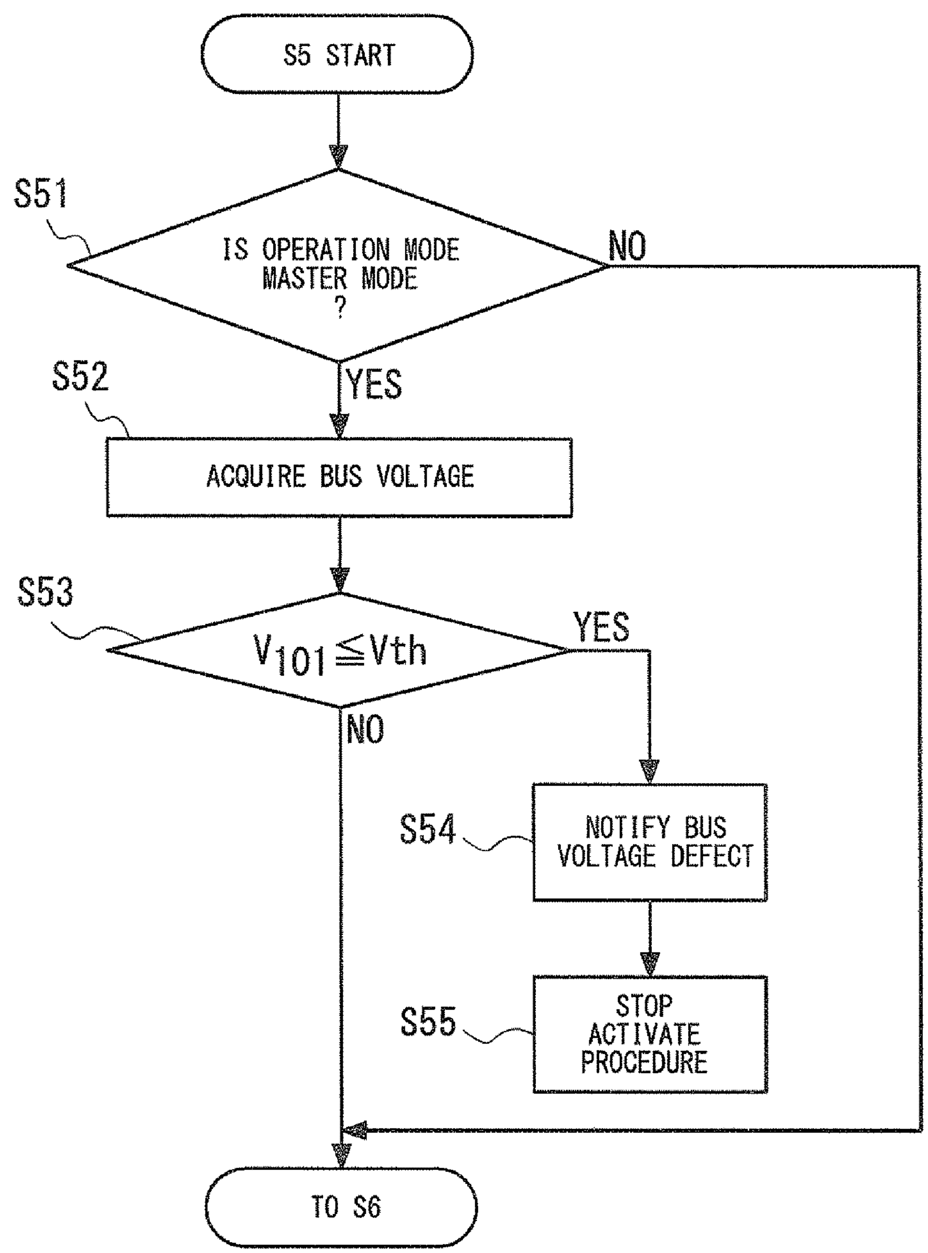
FIG. 10 is a flow chart showing a procedure of the operation mode adequacy determination S5.

Subsequently, detail of the operation mode adequacy determination S5 will be described. FIG. 10 is a flow chart showing a procedure of the operation mode adequacy determination S5. The operation mode adequacy determination S5 includes an operation mode determination step S51, a bus voltage acquisition step S52, a bus voltage value determination step S53, a bus voltage defect notification step S54, and an activation process stopping step S55.

Operation Mode Determination Step S51

The operation mode management unit 192 determines which of the master mode, the stand-alone mode, and the designated power transmission/reception mode is the operation mode of the activation target leg (the first leg 11) designated by the operation mode designation information MODE.

Bus Voltage Acquisition Step S52

When the operation mode of the activation target leg (the first leg 11) designated by the operation mode designation information MODE is the master mode, the operation mode management unit 192 acquires the bus voltage $V_{101}$ of the DC bus 101 from the voltage 103 via the DA/AD conversion unit 194 and the sensor-value readout unit 195.

Bus Voltage Value Determination Step S53

The operation mode management unit 192 determines whether the bus voltage $V_{101}$ acquired in the bus voltage acquisition step S52 is equal to or more than a predetermined value Vth. When the bus voltage $V_{101}$ is equal to or more than the predetermined value Vth, the flow proceeds to the leg stopping step S6.

Bus Voltage Defect Notification Step S54

When the bus voltage $V_{101}$ is less than the predetermined value, the operation mode management unit 192 outputs an alarm of a bus voltage defect to the management server 850.

Activation Process Stopping Step S55

The operation mode management unit 192 stops the activation process after outputting the alarm of the bus voltage defect.

Figure 11:
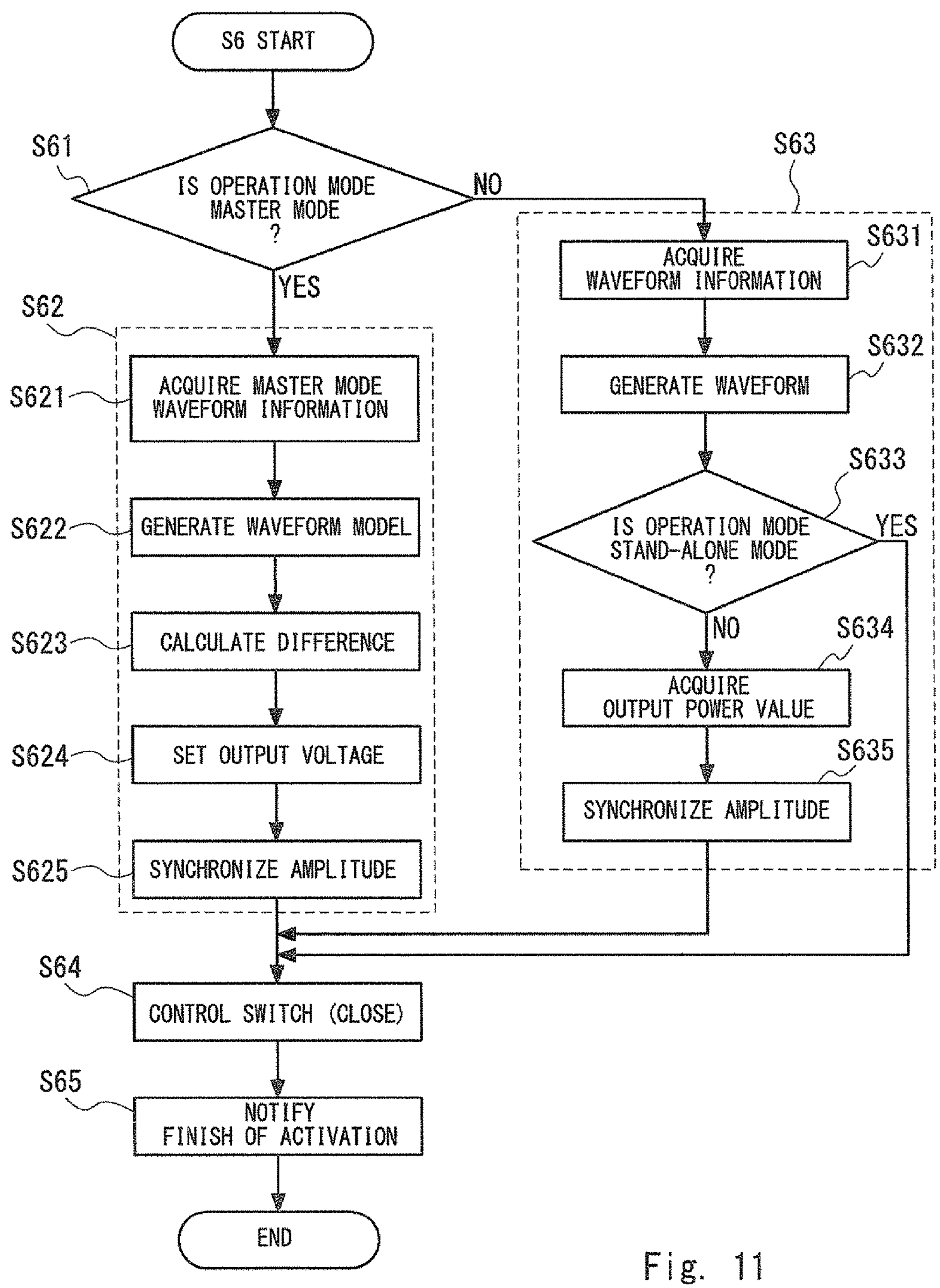
FIG. 11 is a flow chart showing a procedure of a leg activation step S6.

Continuously, detail of the leg activation step S6 will be described. FIG. 11 is a flow chart showing a procedure of the leg activation step S6. The leg activation step S6 includes a first operation mode determination step S61, a master mode waveform generation step S62, a non-master mode waveform generation step S63, a switch control step S64, and a finish of the activation notification step S65.

First Operation Mode Determination Step S61

The operation mode management unit 192 determines whether the operation mode of the activation target leg (the first leg 11) designated by the operation mode designation information MODE is the master mode.

Master Mode Waveform Generation Step S62

The master mode waveform generation step S62 is a step of generating a waveform for the power transmission in the master mode. The master mode waveform generation step S62 includes a master mode waveform-information acquisition step S621, a waveform model generation step S622, a difference calculation step S623, an output voltage determination step S624, and an amplitude synchronization step S625.

Master Mode Waveform-Information Acquisition Step S621

When the operation mode is the master mode, the operation mode management unit 192 acquires voltage amplitude and a period of the voltage waveform of a connection partner (e.g., the utility grid) of the activation target leg (the first leg 11). Specifically, the operation mode management unit 192 acquires a voltage Vr of the branch line BL, which is connected to outside via the terminal 115, from the voltage sensor 113 via the DA/AD conversion unit 194 and the sensor-value readout unit 195. The operation mode management unit 192 acquires the voltage amplitude and the period of the voltage waveform from the acquired voltage Vr. In this case, for example, the voltage amplitude and the period of the voltage waveform of the connection partner (e.g., the utility grid) can be acquired by the so-called zero-point detection.

Waveform Model Generation Step S622

The operation mode management unit 192 generates a waveform model temporally synchronized with the acquired period. In this case, the waveform model is generated as a sinusoidal wave.

Difference Calculation Step S623

The operation mode management unit 192 calculates a difference ΔV ($\Delta V = V0 - V_{101}$) between a rated value V0 of the bus voltage and the present bus voltage $V_{101}$.

Output Voltage Determination Step S624

The operation mode management unit 192 determines an output voltage of the activation target leg (the first leg 11) according to the difference ΔV.

Amplitude Synchronization Step S625

The operation mode management unit 192 synchronizes amplitude of the waveform model with the determined value of the output voltage. The operation mode management unit 192 outputs information of the waveform model in which a synchronization of the amplitude is finished as the waveform instruction signal SD1. The power conversion instruction unit 193 receives the waveform instruction signal SA1 that is a signal converted from the waveform instruction signal SD1 by being converted from digital to analog in the DA/AD conversion unit 194. Thus, the first leg 11 finishes a preparation for transmitting the power in synchronization with the external utility grid as the master leg.

Non-Master Mode Waveform Generation Step S63

The non-master mode waveform generation step S63 is a step of generating a waveform for the power transmission in the operation mode other than the master mode. The non-master mode waveform generation step S63 includes a waveform-information acquisition step S631, a waveform model generation step S632, a second operation mode determination step S633, an output voltage value acquisition step S634, and an amplitude synchronization step S635.

Waveform-Information Acquisition Step S631

Meanwhile, when the operation mode is the stand-alone mode or the designated power transmission/reception, the operation mode management unit 192 reads out amplitude of the output voltage waveform and a period of the output voltage waveform of a connection partner (e.g., the leg of other power router, etc.) of the activation target leg (the first leg 11) from the control instruction database 196.

Waveform Model Generation Step S632

The operation mode management unit 192 generates a waveform model synchronized with the readout amplitude of the output voltage waveform and period of the output voltage waveform. In this case, the waveform model is generated as a sinusoidal wave. The operation mode management unit 192 outputs information of the generated waveform model as the waveform instruction signal SD1. The power conversion instruction unit 193 receives the waveform instruction signal SA1 that is the signal converted from the waveform instruction signal SD1 by being converted from digital to analog in the DA/AD conversion unit 194. Thus, the first leg 11 finishes a preparation for transmitting the power to legs in another external power router and so on as a leg of the stand-alone mode and the designated power transmission/reception mode.

Second Operation Mode Determination Step S633

The operation mode management unit 192 determines whether the operation mode of the activation target leg (the first leg 11) designated by the operation mode designation information MODE is the stand-alone mode. When the operation mode is the stand-alone mode, the flow proceeds to the switch control step S64.

Output Voltage Value Obtaining Step S634

When the operation mode is the designated power transmission/reception mode, the operation mode management unit 192 reads out an output power value in the designated power transmission/reception mode from the control instruction database 196.

Amplitude Synchronization Step S635

The operation mode management unit 192 synchronizes amplitude of the waveform model with the readout output power value. The operation mode management unit 192 outputs information of the waveform model in which a synchronization of the amplitude is finished as the waveform instruction signal SD1. The power conversion instruction unit 193 receives the waveform instruction signal SA1 that is the signal converted from the waveform instruction signal SD1 by being converted from digital to analog in the DA/AD conversion unit 194. Thus, the first leg 11 finishes a preparation for transmitting the power with synchronization with the external utility grid as the designated power transmission/reception mode leg.

Switch Control Step S64

The operation mode management unit 192 causes the switch 113 to be in a "close" condition by the switching control signal SIG1. Thus, the activation target leg (the first leg 11) can transmit the power.

Finish of the Activation Notification Step S95

The operation mode notifies the management server 850 of that the activation of the activation target leg (the first leg 11) is finished after the master mode waveform generation step S62 or the non-master mode waveform generation step S63.

As described above, the power router 200 can activate the activation target leg, which is designated by the control instruction, in the designated operation mode to achieve the control instruction of the management server 850 from a plurality of the legs, in the designated operation mode. Specifically, the power router 200 receives the control instruction 52 from the management server 850 by the control unit 19. The received control instruction 52 is stored in the memory unit 191 in the control unit 19 as the control instruction database 196 and read out by the operation mode management unit 192. The operation mode management unit 192 can specifically designate the activation target leg (the first leg 11) by checking the control instruction database 196 against the leg identification information database 197. Then, the operation mode management unit 192 can activate the activation target leg (the first leg 11) in the designated operation mode.

According to the present configuration, it is possible to activate the activation target leg (the first leg 11), which is provided in the power router, in the designated operation mode based on the control instruction 52 from the management server 850. Thus, it is specifically achieve a power router that can cause the power router, which is in operation in any operation mode, to be in the other operation mode.

Third Exemplary Embodiment

Next, a third exemplary embodiment will be described. In the present exemplary embodiment, an example of a power network system configured by using one or more power routers will be described. Note that the power network system is configured by using power routers 1011 to 1014, and any power routers according to the first and second exemplary embodiments may be used as each of the power routers 1011 to 1014.

Figure 12:
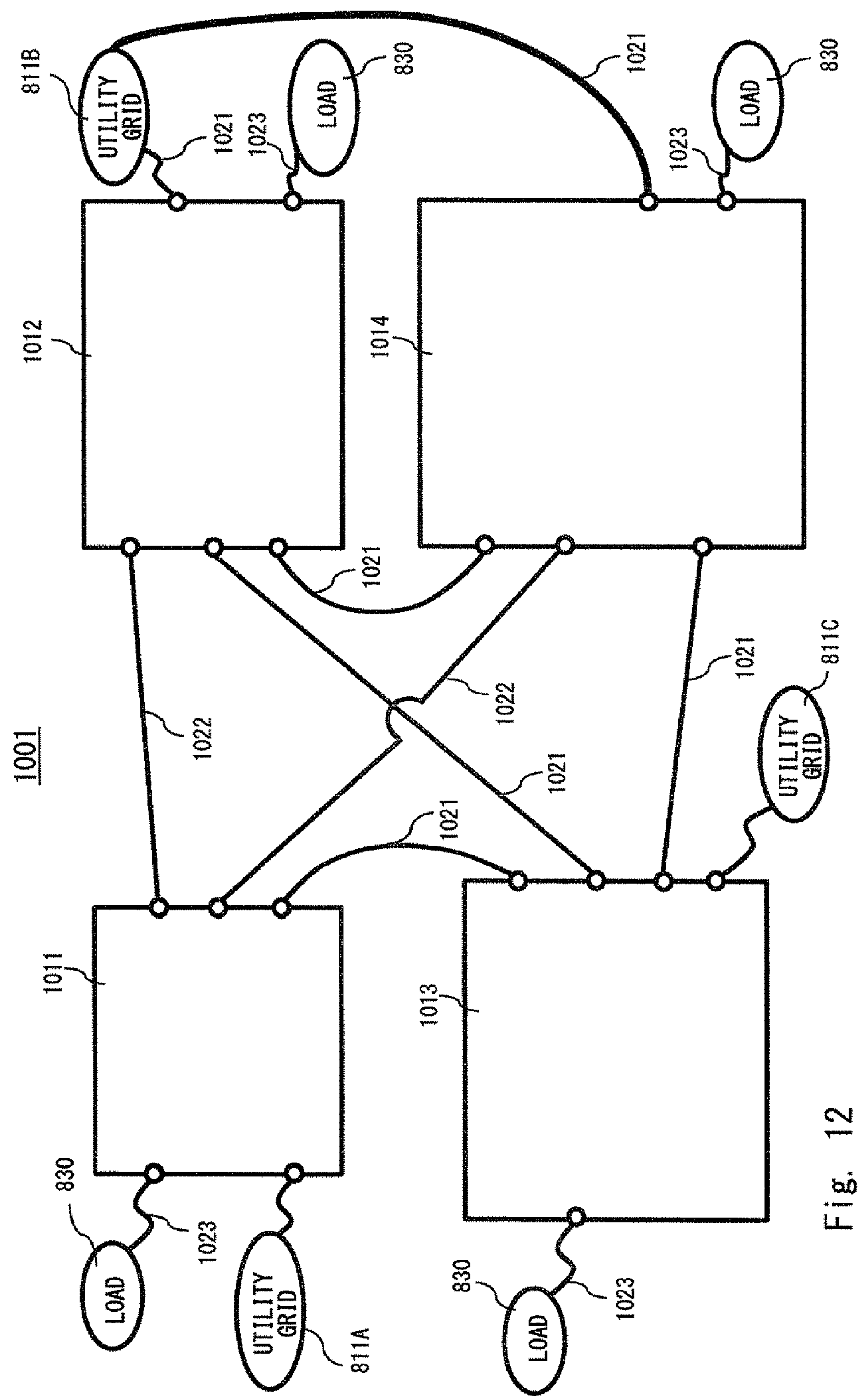
FIG. 12 is a block diagram schematically showing a configuration of a power network system 1001 that is an example of a power network system.

FIG. 12 is a block diagram schematically showing a configuration of a power network system 1001 that is an example of a power network system. In FIG. 12, for simplifying the drawing, numerical signs of the legs are omitted. White circle attached to the power routers 1011 to 1014 represent connection terminals, respectively.

Here, a connection line connecting the power router with connection partner will be complemented. When a connection line connecting the power routers with each other is referred to as a power transmission line, the power transmission line may be a part of the utility grid or separated from the utility grid. In FIG. 12, a numerical sign 1021 is attached to the power transmission line that is a part of the utility grid, and a numerical sign 1022 is attached to the power transmission line that is separated from the utility grid. That is, a plurality of the power routers are connected with the utility grid. A power can be interchanged among a plurality of the power routers via the utility grid by connecting the tow or more power routers via the utility grid in such manner, so that it is also possible to compensate deficiency and excess of the interchanged power by the utility grid. Meanwhile, two or more power routers can be connected with each other without interposition of the utility grid.

Further, when a connection line connecting the power router with the load 830 (or a distributed power source) is referred to as a power distribution line 1023, the power distribution line 1023 is separated from the utility grids 811A to 811C. That is, the power distribution line 1023 that connects the power router with the load 830 (or a distributed power source) is not connected with the utility grids 811A to 811C.

Figure 13:
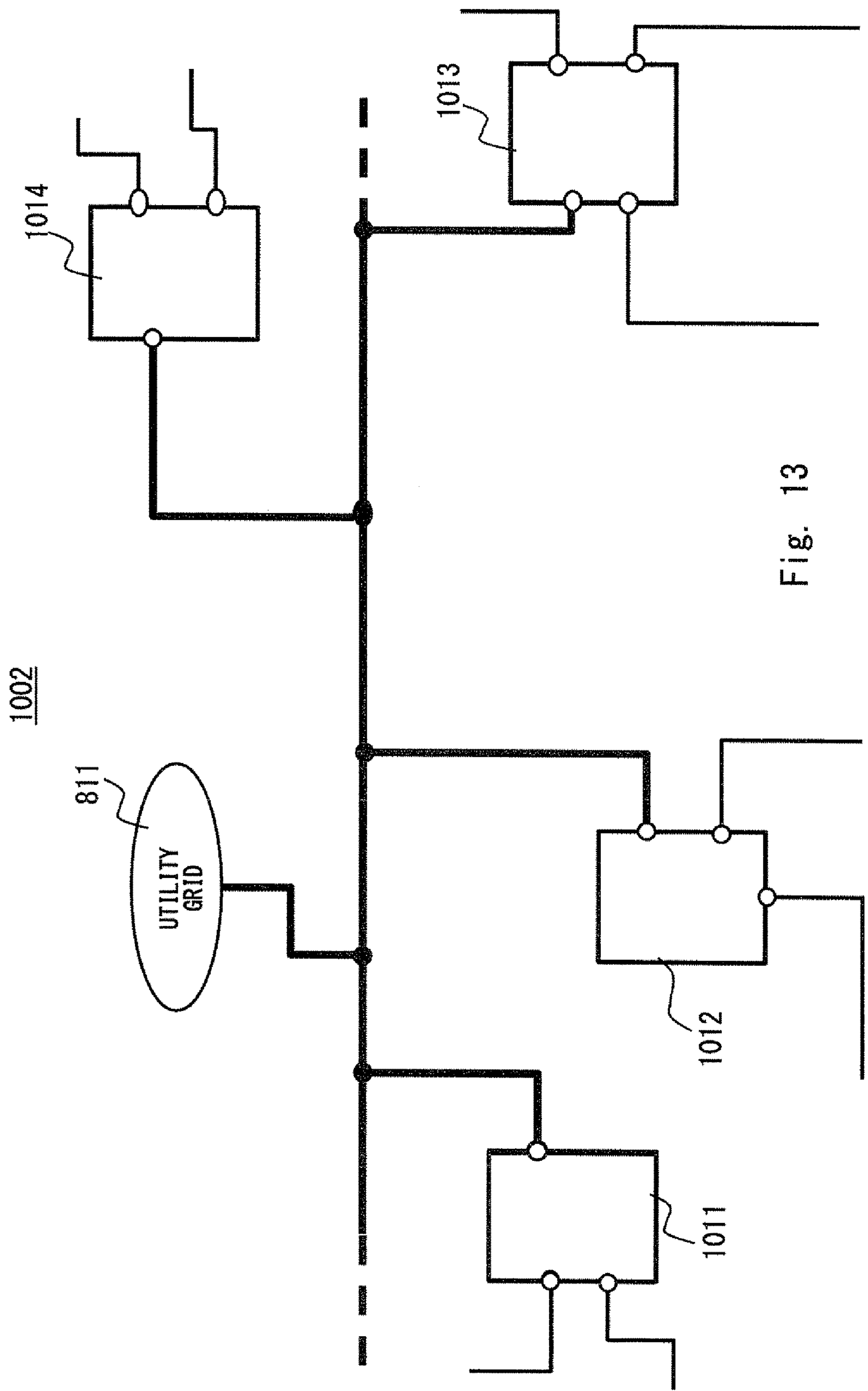
FIG. 13 is a block diagram schematically showing a configuration of a power network system 1002 that is an example of a power network system.

Another example of the power network system will be described. FIG. 13 is a block diagram schematically showing a configuration of a power network system 1002 that is an example of a power network system. In FIG. 13, for simplifying the drawing, only the power routers 1011 to 1014 and the utility grid 811 are represented. In FIG. 13, the connection line is represented by a thick line, and the power distribution line is represented by a thin line. As shown in FIG. 13, the power routers 1011 to 1014 may be connected in a manner of a bus connection.

Although a description of the operation mode of each leg will be omitted, it will be appreciated that the operation mode of each leg has to be selected by appropriately in consideration of a direction of the power interchange and the connection restriction described above.

Note that, in FIG. 13, it will be appreciated that the utility grid 811 may be replaced with the distributed power source such as a storage battery and a power generation facility. That is, a plurality of the power routers may be connected with the distributed power source in a manner of the bus connection.

Figure 14:
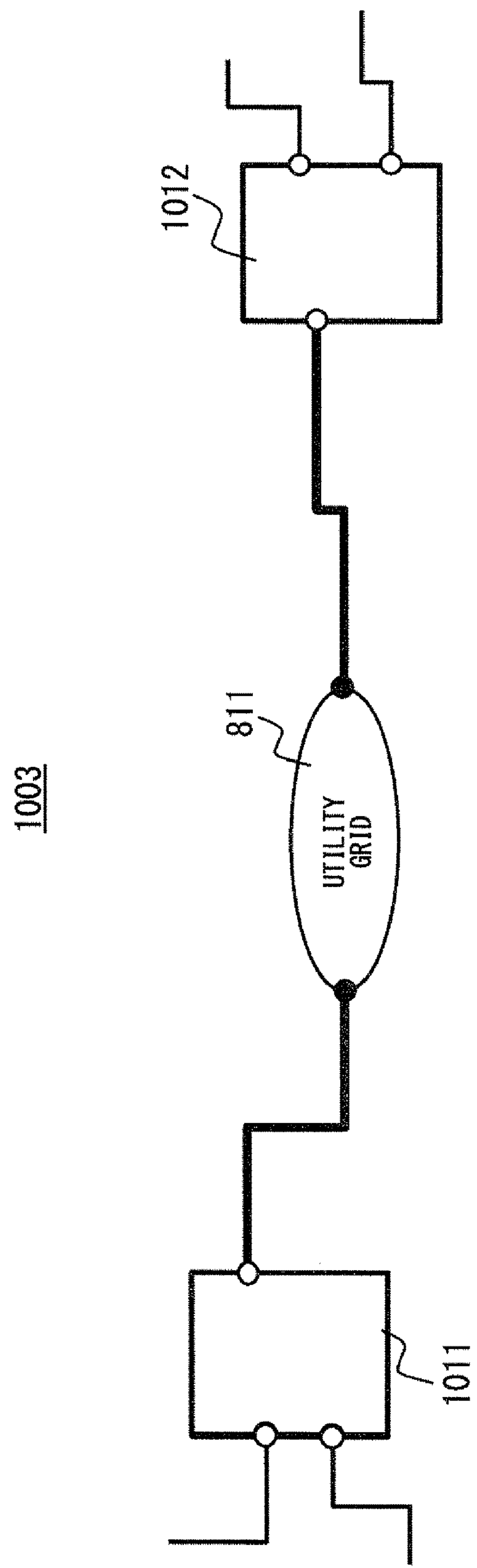
FIG. 14 is a block diagram schematically showing a configuration of a power network system 1003 that is an example of the power network system.

Further, another example of the power network system will be described. FIG. 14 is a block diagram schematically showing a configuration of a power network system 1003 that is an example of a power network system. In FIG. 14, for simplifying the drawing, only the power routers 1011 and 1012 and the utility grid 811 are represented. In FIG. 14, the connection line is represented by a thick line, and the power distribution line is represented by a thin line. As shown in FIG. 14, a configuration in which the power routers 1011 and 1012 are connected with the utility grid 811 may be adopted.

Note that, in FIG. 14, it will be appreciated that the utility grid 811 may be replaced with the distributed power source.

As described above, the utility grid, the distributed power source including the storage battery and the power facility, and the power routers is regarded as the connection partner of the power router. In the present specification and claims, these are referred to as a power system.

As described above, according to the power router of the present exemplary embodiment, the effects described below can be provided.

That is, the power network system in which the power cells are asynchronously connected with each other can be configured. Then, as described in the present exemplary embodiment, it is possible to cause the leg in the power router to operate just as the control instruction from the management server and specifically manage the power interchange or the like in the power network system.

Other Exemplary Embodiments

Further, the present invention is not limited to the above-described exemplary embodiments, and needless to say, various modifications can be made without departing from the spirit and scope of the present invention described above. For example, although the control unit 19 is described as a hardware configuration in the above-described exemplary embodiments, it is not limited to the hardware configurations. The control unit 19 may be configured by a computer and arbitrary processing can be also implemented by causing a CPU (Central Processing Unit) to execute a computer program. The power converting unit incorporates a control device therein, and the control devise is, for example, a dynamic reconfiguration logic (FPGA:Field Programmable Gate Array). A content of the control program of the FPGA is changed to suit the mode of the legs, and then the control program operates. Thus, scale of the hardware and a cost can be decreased, because an operation can be controlled according to the operation mode by rewriting the FPGA according to a type of the leg and the operation. The above-described program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, a DVD (Digital Versatile Disc), a BD (Blu-ray (registered trademark) Disc), and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Although the present invention is explained above with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent applications No. 2013-013632, filed on Jan. 28, 2013, the disclosure of which is incorporated herein in its entirety by reference.

REFERENCE SIGNS LIST

11, 21, 31, 41 FIRST LEGS
12, 22, 32, 42 SECOND LEGS
13, 23, 33, 43 THIRD LEGS
14, 24, 34, 44 FORTH LEGS
19 CONTROL UNIT
52 CONTROL INSTRUCTION
60 AC THROUGH LEG
100, 170, 200, 1011 TO 1014 POWER ROUTERS
101 DIRECT CURRENT (DC) BUS
102 COMMUNICATION BUS
103 VOLTAGE SENSOR
111, 121, 131, 141, 151 POWER CONVERTING UNITS
111D FEEDBACK DIODE
111P ANTIPARALLEL CIRCUIT
111T THYRISTOR
112, 122, 132, 142, 152, 162 CURRENT SENSORS
113, 123, 133, 143, 153, 163 SWITCHS
114, 124, 134, 144, 154, 164 VOLTAGE SENSORS
115, 125, 135, 145, 155, 165 CONNECTION TERMINALS
121T THYRISTOR
191 MEMORY UNIT
192 OPERATION MODE MANAGEMENT UNIT
193 POWER CONVERSION INSTRUCTION UNIT
194 DA/AD CONVERSION UNIT
195 SENSOR-VALUE READOUT UNIT
196 CONTROL INSTRUCTION DATABASE (#1DB)
197 LEG IDENTIFICATION INFORMATION DATABASE (#2DB)
810, 1001 TO 1003 POWER NETWORK SYSTEMS
811, 811A TO 811C UTILITY GRIDS
812 LARGE-SCALE POWER PLANT
821 TO 824 POWER CELLS
831 HOUSES
832 BUILDINGS
833 SOLAR PANEL
834 WIND TURBINE
835 STORAGE BATTERY
841 TO 844 POWER ROUTERS
850 MANAGEMENT SERVER
851 COMMUNICATION NETWORK
1021, 1022 CONNECTION LINE
1023 POWER DISTRIBUTION LINE
BL BRANCH LINE
MODE OPERATION MODE DESIGNATION INFORMATION
SA1, SD1 WAVEFORM INSTRUCTION SIGNALS
SA2, SD2 READOUT SIGNALS
SCON CONTROL SIGNAL
SIG1 SWITCHING CONTROL SIGNAL

The invention claimed is:

1. A power router, comprising:

a direct current bus whose voltage is controlled to be maintained at a voltage level;

a plurality of power conversion legs having one end connected to the direct current bus and another end communicatively coupled to a connection partner, each of the plurality of power conversion legs allowing power to flow bi-directionally between the direct current bus and the connection partner; and a control unit that determines whether a stopping target leg instructed by a control instruction can be stopped, and stops the stopping target leg when the stopping target leg can be stopped, wherein a power conversion leg selected from the plurality of power conversion legs is operated in a master mode, wherein the power conversion leg that is operated in the master mode transmits power to or receives power from the connection partner to maintain the direct current bus voltage at the voltage level, when other power conversion legs except for the stopping target leg do not stop their operations and the stopping target leg is operated in the master mode, the control unit switches another power conversion leg other than the stopping target leg to the master mode and stops the stopping target leg, and when any of the other power conversion legs except for the stopping target leg stop their operations, the control unit notifies that the stopping of the stopping target leg is impossible to outside and continues to operate the stopping target leg.

2. The power router according to claim 1, wherein when the stopping target leg is operated in the master mode before the stopping target leg is stopped, the control unit gradually reduces transmission/reception power of the stopping target leg to stop power transmission/reception of the stopping target leg and gradually increases transmission/reception power of the power conversion leg that has been switched to the master mode, and when the stopping target leg is not operated in the master mode before the stopping target leg is stopped, the control unit gradually reduces the transmission/reception power of the stopping target leg to stop the power transmission/reception of the stopping target leg, and notifies that the stopping of the stopping target leg is finished to the outside after the stopping target leg is stopped.

3. The power router according to claim 1, wherein the control unit activates the stopping target leg in another operation mode as an activation target leg after the stopping target leg is stopped.

4. The power router according to claim 3, wherein the control unit:

receives a control instruction including a designation of an activation target leg in the plurality of the power conversion legs and a designation of an operation mode of the activation target leg;

determines whether the activation target leg can be activated in a designated operation mode; and activates the activation target leg in the designated operation mode when the activation target leg can be activated in the designated operation mode.

5. The power router according to claim 4, wherein the control unit:

determines which of a master mode, a designated power transmission/reception mode, the power router transmitting to the connection partner or receiving power from the connection partner in the designated power transmission/reception mode, and a stand-alone mode, the power router producing a voltage and a frequency and transmits a power to the second power conversion leg in the stand-alone mode, is the operation mode designated by the control instruction; and determines whether the activation target leg can be activated in each operation mode.

6. The power router according to claim 5, wherein the control unit:

acquires the voltage of the direct current bus when the operation mode designated by the control instruction is the master mode;

determines that the activation target leg can be activated when the voltage of the direct current bus is larger than a predetermined value; and notifies outside of a bus voltage defect and stops activating the activation target leg when the voltage of the direct current bus is smaller than the predetermined value.

7. The power router according to claim 5, wherein when the operation mode designated by the control instruction is not the master mode, the control unit:

determines whether there is a leg operating in the master mode in the plurality of power conversion legs other than the activation target leg;

determines that the activation target leg can be activated when there is the leg operating in the master mode; and notifies outside that there is not the leg of the master mode and stops activating the activation target leg when there is not the leg operating in the master mode.

8. The power router according to claim 4, wherein the power conversion leg comprises:

a power conversion unit that is connected between the first connection terminal and the second connection terminal and bi-directionally converts the power between the first connection terminal and the second connection terminal;

a current sensor that detects a current flowing between the power conversion unit and the second connection terminal;

a switch that is inserted between the power conversion unit and the second connection terminal and connects or disconnects between the power conversion unit and the second connection terminal; and a voltage sensor that detects a voltage between the switch and the second connection terminal.

9. The power router according to claim 8, wherein when the activation target leg can be activated, the control unit:

determines which of the master mode, the designated power transmission/reception mode, and the stand-alone mode is the operation mode designated by the control instruction; and activates the activation target leg in a different condition in each operation mode.

10. The power router according to claim 9, wherein when the operation mode designated by the control instruction is the master mode, the control unit:

acquires voltage amplitude and a frequency of a connection partner from the voltage sensor in the activation target leg;

generates a waveform model that is temporally synchronized with the frequency;

calculates a difference between the voltage of the direct current bus and the voltage amplitude; and sets amplitude of the waveform model based on the difference and sets the waveform model to the power conversion unit in the activation target leg.

11. The power router according to claim 10, wherein when the operation mode designated by the control instruction is not the master mode, the control unit:

acquires a frequency of a waveform model included in the control instruction; and generates a waveform model that is temporally synchronized with the frequency.

12. The power router according to claim 10, wherein the control unit:

determines which of the designated power transmission/reception mode and the stand-alone mode is the operation mode designated by the control instruction;

when the operation mode designated by the control instruction is the designated power transmission/reception mode, acquires amplitude of a waveform model included in the control instruction; and sets the acquired amplitude as the amplitude of the waveform model and sets the waveform model to the power conversion unit in the activation target leg; and when the operation mode designated by the control instruction is the stand-alone mode, sets the generated waveform model to the power conversion unit in the activation target leg.

13. The power router according to claim 11, wherein after setting the waveform model of the power conversion unit, the control unit:

controls the switch to connect the power conversion unit with the second connection terminal; and notifies outside that the activation is finished.

14. A power network system comprising:

one or more power routers; and a power system that is directly or indirectly connected with the one or more power routers, wherein each of the one or more power routers comprises:

a direct current bus whose voltage is controlled to be maintained at a voltage level;

a plurality of power conversion legs having one end connected to the direct current bus and another end communicatively coupled to an connection partner, each of the plurality of power conversion legs allowing power to flow bi-directionally between the direct current bus and the connection partner; and a control unit that determines whether a stopping target leg instructed by a control instruction can be stopped, and stops the stopping target leg when the stopping target leg can be stopped, wherein a power conversion leg selected from the plurality of power conversion legs is operated in a master mode, wherein the power conversion leg that is operated in the master mode transmits power to or receives power from the connection partner to maintain the direct current bus voltage at the voltage level, when other power conversion legs except for the stopping target leg do not stop their operations and the stopping target leg is operated in the master mode, the control unit switches another power conversion leg other than the stopping target leg to the master mode and stops the stopping target leg, and when any of the other power conversion legs except for the stopping target leg stop their operations, the control unit notifies that the stopping of the stopping target leg is impossible to outside and continues to operate the stopping target leg.

15. An operation control method of a power router, the power router including:

a direct current bus whose voltage is controlled to be maintained at a voltage level; and a plurality of power conversion legs having one end connected to the direct current bus and another end communicatively coupled to an connection partner, each of the plurality of power conversion legs allowing power to flow bi-directionally between the direct current bus and the connection partner, in the power router, the method comprising:

determining whether a stopping target leg instructed by a control instruction can be stopped, and stopping the stopping target leg when the stopping target leg can be stopped, wherein a power conversion leg selected from the plurality of power conversion legs is operated in a master mode, wherein the power conversion leg that is operated in the master mode transmits power to or receives power from the connection partner to maintain the direct current bus voltage at the voltage level, and the method further comprises:

when other power conversion legs except for the stopping target leg do not stop their operations and the stopping target leg is operated in the master mode, switching another power conversion leg other than the stopping target leg to the master mode and stopping the stopping target leg, and when any of the other power conversion legs except for the stopping target leg stop their operations, notifying that the stopping of the stopping target leg is impossible to outside and continuing to operate the stopping target leg.

16. A non-transitory computer readable media storing a power router operation control program, the power router including:

a direct current whose voltage is controlled to be maintained at a voltage level;

a plurality of power conversion legs having one end connected to the direct current bus and another end communicatively coupled to an connection partner, each of the plurality of power conversion legs allowing power to flow bi-directionally between the direct current bus and the connection partner; and a computer that configures a control unit that controls operations of the plurality of power conversion legs, the program causing the computer to execute:

a process of determining whether a stopping target leg instructed by a control instruction can be stopped; and a process of stopping the stopping target leg when the stopping target leg can be stopped, wherein a power conversion leg selected from the plurality of power conversion legs is operated in a master mode, wherein the power conversion leg that is operated in the master mode transmits power to or receives power from the connection partner to maintain the direct current bus voltage at the voltage level, and the program causes the computer to further execute:

when other power conversion legs except for the stopping target leg do not stop their operations and the stopping target leg is operated in the master mode, a process of switching another power conversion leg other than the stopping target leg to the master mode and stopping the stopping target leg, and when any of the other power conversion legs except for the stopping target leg stop their operations, a process of notifying that the stopping of the stopping target leg is impossible to outside and continuing operation of the stopping target leg.

17. A non-transitory computer readable media storing a management device control program comprising:

one or more power routers;

a power system that is directly or indirectly connected with the power router; and a computer that configures a management device controlling operations of the one or more power routers, wherein each of the one or more power routers comprises:

a direct current bus whose voltage is controlled to be maintained at a voltage level;

a plurality of power conversion having one end connected to the direct current bus and another end communicatively coupled to an connection partner, each of the plurality of power conversion legs allowing power to flow bi-directionally between the direct current bus and the connection partner; and a control unit that controls operations of the plurality of power conversion legs;

the program causes the computer to execute a process of outputting a control instruction including a designation of a stopping target leg that is a target leg to be stopped in the plurality of power conversion legs to the stopping target leg included in any one of the one or more power routers; and the control unit:

determines whether a stopping target leg instructed by the control instruction can be stopped; and stops the stopping target leg when the stopping target leg can be stopped, wherein a power conversion leg selected from the plurality of power conversion legs is operated in a master mode, wherein the power conversion leg that is operated in the master mode transmits power to or receives power from the connection partner to maintain the direct current bus voltage at the voltage level, when other power conversion legs except for the stopping target leg do not stop their operations and the stopping target leg is operated in the master mode, the control unit switches another power conversion leg other than the stopping target leg to the master mode and stops the stopping target leg, and when any of the other power conversion legs except for the stopping target leg stop their operations, the control unit notifies that the stopping of the stopping target leg is impossible to outside and continues to operate the stopping target leg.

18. A power router comprising:

a direct current bus whose voltage is controlled to be maintained at a voltage level;

a plurality of power conversion legs having one end connected to the direct current bus and another end communicatively coupled to an connection partner, each of the plurality of power conversion legs allowing power to flow bi-directionally between the direct current bus and the connection partner; and a control means for determining whether a stopping target leg instructed by a control instruction can be stopped, and stopping the stopping target leg when the stopping target leg can be stopped, wherein a power conversion leg selected from the plurality of power conversion legs is operated in a master mode, wherein the power conversion leg that is operated in the master mode transmits power to or receives power from the connection partner to maintain the direct current bus voltage at the voltage level, when other power conversion legs except for the stopping target leg do not stop their operations and the stopping target leg is operated in the master mode, the control means switches another power conversion leg other than the stopping target leg to the master mode and stops the stopping target leg, and when any of the other power conversion legs except for the stopping target leg stop their operations, the control means notifies that the stopping of the stopping target leg is impossible to outside and continues to operate the stopping target leg.

19. A power network system comprising:

one or more power routers; and a power system that is directly or indirectly connected with the power router, wherein each of the one or more power routers comprises:

a direct current bus whose voltage is controlled to be maintained at a voltage level;

a plurality of power conversion legs having one end connected to the direct current bus and another end communicatively coupled to an connection partner, each of the plurality of power conversion legs allowing power to flow bi-directionally between the direct current bus and the connection partner; and a control means for determining whether a stopping target leg instructed by a control instruction can be stopped, and stopping the stopping target leg when the stopping target leg can be stopped, wherein a power conversion leg selected from the plurality of power conversion legs is operated in a master mode, wherein the power conversion leg that is operated in the master mode transmits power to or receives power from the connection partner to maintain the direct current bus voltage at the voltage level, when other power conversion legs except for the stopping target leg do not stop their operations and the stopping target leg is operated in the master mode, the control unit switches another power conversion leg other than the stopping target leg to the master mode and stops the stopping target leg, and when any of the other power conversion legs except for the stopping target leg stop their operations, the control unit notifies that the stopping of the stopping target leg is impossible to outside and continues to operate the stopping target leg.

20. A non-transitory computer readable media storing a power router operation control program, the power router including:

a direct current bus whose voltage is controlled to be maintained at a voltage level;

a plurality of power conversion legs having one end connected to the direct current bus and another end communicatively coupled to an connection partner, each of the plurality of power conversion legs allowing power to flow bi-directionally between the direct current bus and the connection partner; and a computer that configures a control means for controlling operations of the plurality of power conversion legs, the program causing the computer to execute:

a process of determining whether a stopping target leg instructed by a control instruction can be stopped; and a process of stopping the stopping target leg when the stopping target leg can be stopped, wherein a power conversion leg selected from the plurality of power conversion legs is operated in a master mode, wherein the power conversion leg that is operated in the master mode transmits power to or receives power from the connection partner to maintain the direct current bus voltage at the voltage level, and the program causes the computer to further execute:

when other power conversion legs except for the stopping target leg do not stop their operations and the stopping target leg is operated in the master mode, a process of switching another power conversion leg other than the stopping target leg to the master mode and stopping the stopping target leg, and when any of the other power conversion legs except for the stopping target leg stop their operations, a process of notifying that the stopping of the stopping target leg is impossible to outside and continuing operation of the stopping target leg.

21. A non-transitory computer readable media storing a management device control program comprising:

one or more power routers;

a power system that is directly or indirectly connected with the power router; and a computer that configures a management device controlling operations of the one or more power routers, wherein each of the one or more power routers comprises:

a direct current bus whose voltage is controlled to be maintained at a voltage level;

a plurality of power conversion legs having one end connected to the direct current bus and another end communicatively coupled to an connection partner, each of the plurality of power conversion legs allowing power to flow bi-directionally between the direct current bus and the connection partner; and a control means for controlling operations of the plurality of power conversion legs;

the program causes the computer to execute a process of outputting a control instruction including a designation of a stopping target leg that is a target leg to be stopped in the plurality of power conversion legs to the stopping target leg included in any one of the one or more power routers; and the control means:

determines whether a stopping target leg instructed by the control instruction can be stopped; and stops the stopping target leg when the stopping target leg can be stopped, wherein a power conversion leg selected from the plurality of power conversion legs is operated in a master mode, wherein the power conversion leg that is operated in the master mode transmits power to or receives power from the connection partner to maintain the direct current bus voltage at the voltage level, when other power conversion legs except for the stopping target leg do not stop their operations and the stopping target leg is operated in the master mode, the control unit switches another power conversion leg other than the stopping target leg to the master mode and stops the stopping target leg, and when any of the other power conversion legs except for the stopping target leg stop their operations, the control unit notifies that the stopping of the stopping target leg is impossible to outside and continues to operate the stopping target leg.

* * * * *